United States Patent
Rawdon et al.

(10) Patent No.: US 7,534,082 B2
(45) Date of Patent: May 19, 2009

(54) CARGO CONTAINER HANDLING SYSTEM AND ASSOCIATED METHOD

(75) Inventors: Blaine K. Rawdon, San Pedro, CA (US); Zachary C. Hoisington, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 11/190,675

(22) Filed: Jul. 27, 2005

(65) Prior Publication Data

US 2007/0025832 A1 Feb. 1, 2007

(51) Int. Cl.
*B65G 67/02* (2006.01)

(52) U.S. Cl. .................... 414/347; 414/396; 414/458; 414/679; 410/72

(58) Field of Classification Search ............ 414/139.9, 414/341, 344, 347, 391, 395, 396, 399, 400, 414/584, 679, 458, 618; 244/118.1, 137.1; 410/72–75, 83
See application file for complete search history.

(56) References Cited

U.S. PATENT DOCUMENTS

| | | | | |
|---|---|---|---|---|
| 2,828,027 | A | * | 3/1958 | Stevenson et al. ........... 414/349 |
| 2,858,774 | A | * | 11/1958 | Batten ........................ 410/67 |
| 3,255,906 | A | * | 6/1966 | Proler et al. ................ 414/458 |
| 3,460,686 | A | * | 8/1969 | Cole ........................ 414/139.9 |
| 3,521,773 | A | * | 7/1970 | Geister ....................... 414/458 |
| 3,595,407 | A | * | 7/1971 | Muller-Kuhn et al. ....... 414/344 |
| 3,853,230 | A | * | 12/1974 | Schultz ....................... 414/564 |
| 3,954,232 | A | | 5/1976 | Harper |
| 4,049,135 | A | * | 9/1977 | Glassmeyer ................ 414/351 |
| 4,699,337 | A | * | 10/1987 | Lewis ....................... 244/137.1 |
| 4,832,559 | A | * | 5/1989 | Gebbardt .................... 414/392 |
| 4,941,794 | A | * | 7/1990 | Hara et al. .................. 414/341 |
| 5,186,596 | A | * | 2/1993 | Boucher et al. ............. 414/395 |
| 5,618,148 | A | | 4/1997 | Iversen et al. |

(Continued)

FOREIGN PATENT DOCUMENTS

EP 0 357 087 3/1990

(Continued)

OTHER PUBLICATIONS

Partial ISR for PCT/US2006/019699 which was an annex to the Invitation to Pay Additional Fees mailed on Nov. 14, 2006.

(Continued)

*Primary Examiner*—James Keenan
(74) *Attorney, Agent, or Firm*—Alston & Bird LLP

(57) ABSTRACT

A system and method for cargo handling is provided. The system includes a transport vehicle including a cargo bay capable of housing a plurality of cargo containers, and a loading dock for coupling to the cargo bay. The system also includes at least one railcar and pylons positioned along a floor of the cargo bay. A predetermined number of pylons are operable to elevate and lower a cargo container within the cargo bay. The present invention also provides a railcar for transporting cargo containers, as well as an apparatus for positioning at least one cargo container within a transport vehicle. The present invention also provides a system for aligning a loading dock and a transport vehicle that includes a mechanism for adjusting the height of the transport vehicle or loading dock, or a plurality of engagement members that are capable of aligning the loading dock and transport vehicle.

17 Claims, 16 Drawing Sheets

U.S. PATENT DOCUMENTS

| | | | |
|---|---|---|---|
| 5,951,226 | A | 9/1999 | Fantuzzi |
| 6,120,009 | A | 9/2000 | Gatehouse |
| 6,435,796 | B1 | 8/2002 | Iversen |
| 6,524,050 | B1 | 2/2003 | Arntzen et al. |
| 6,537,009 | B1 | 3/2003 | Le Lan et al. |
| 6,557,800 | B2 * | 5/2003 | Medina et al. ............ 244/118.1 |
| 6,808,142 | B2 * | 10/2004 | Oki .......................... 244/118.1 |
| 6,808,356 | B2 * | 10/2004 | Iwasaki et al. .............. 414/392 |
| 6,910,844 | B2 * | 6/2005 | Trescott ...................... 414/458 |
| 2006/0038077 | A1 * | 2/2006 | Olin et al. ................. 244/137.1 |
| 2008/0219827 | A1 * | 9/2008 | Lanigan et al. ............ 414/792.8 |
| 2008/0298939 | A1 * | 12/2008 | Lanigan et al. .............. 414/344 |

FOREIGN PATENT DOCUMENTS

| | | |
|---|---|---|
| EP | 1 321 398 | 6/2003 |
| JP | 62-259927 * | 11/1987 |
| WO | 91/09792 * | 7/1991 |

OTHER PUBLICATIONS

Jim Adams; Larger loader improves base deployment mission, *Hilltop Times News*, Feb. 10, 2000, 2 pages, available at http://www.hilltoptimes.com/archive/20000210/15.html; downloaded Feb. 3, 2005.

Force Projection, Tunner 60K, *Systems & Electronics Inc.*, 2 pages, available at http://www.seistl.com/force_proj/tunner.htm; downloaded Feb. 3, 2005.

The FastShip Revolution, Enhanced Cargo Handling; *FastShip, Inc.*, 1 page, available at http://www.fastshipatlantic.com/enhancedcargohandling.html; downloaded Jan. 24, 2005.

Military Applications; *FastShip, Inc.*, 1 page, available at http://www.fastshipatlantic.com/militaryapplications.html; downloaded Jan. 24, 2005.

FastShip and the Need for Speed in the New Century; 10 pages, available at http://www.web.archive.org/web/20030410154336/fastshipatlantic.com/bimco.giles/Giles_pape . . . ; downloaded Aug. 31, 2004.

* cited by examiner

CARGO CONTAINER HANDLING SYSTEM AND ASSOCIATED METHOD

BACKGROUND OF THE INVENTION

1) Field of the Invention

The present invention is related to the field of cargo handling, and more particularly, to a system, apparatus, and method for efficiently loading cargo from a loading dock and into a transport vehicle and vice versa.

2) Description of Related Art

Various techniques are utilized for loading and unloading large cargo loads from aircraft, ships, trucks, and similar transport vehicles. Typically, the cargo consists of large containers that are arranged in series and may be loaded concurrently from a loading dock onto the transport vehicle and vice versa. One technique to transport several containers between the loading dock and the transport vehicle is a trolley that may travel on rails. Thus, the containers are loaded pallets on the loading dock, the trolley transports several containers onto the transport vehicle at one time, and the trolley is removed from the transport vehicle. Similarly, to remove the containers from a transport vehicle, the trolley travels into the transport vehicle and transfers the containers to the loading dock, where the containers may then be positioned for further handling.

An example of a system for transporting cargo is disclosed in U.S. Pat. No. 6,435,796 to Iversen. Iverson discloses trolley trains that may travel on rails located on both the deck of a vessel to be loaded and corresponding rails on a loading dock. The trolley trains include cargo trolleys having lifting and driving equipment for lifting cargo pallets, as well as a power trolley for propelling the trolley trains. Each of the cargo trolleys and power trolley are configured to be positioned under load bearing or cargo platforms. The cargo trolleys include guide pins at the top of each trolley that mates with holes in the bottom of the individual platforms. Each of the cargo trolleys lifts each platform from the loading dock and travels along rails onto the vessel and is subsequently lowered such that securing elements are lowered into positioning stands. Similarly, conical studs may be employed on the loading dock and/or on the cargo deck of the vessel that mate to corresponding holes in the platform legs when the platform is lowered to ensure correct platform positioning. Once the platform is lowered onto the vessel, each of the trolleys may then be removed from the vessel, while the train of platforms and associated cargo remains on the vessel. Iversen further provides trolley locking arms that are brought into contact with protruding platform locking arms such that as the trolley is removed from the transport vessel, the platform locking arms are pivoted to a locking position. When the trolleys are transferred back to the transport vessel, each of the platform locking arms are unlocked from the locking position so that the platforms and cargo may be removed from the transport vessel.

Thus, the Iversen patent provides trolleys for transporting a train or trains of platforms supporting cargo between a loading dock and a transport vehicle. Despite these improvements, techniques for more efficiently and effectively transporting cargo are required. For instance, a cargo handling system that is capable of handling standard ISO containers is desired. ISO containers are designed to be handled and carried almost exclusively by standard fittings located at the each corner of the rectangular container. In contrast to platforms and pallets designed for standard cargo systems, the bottom surface of the ISO container is not smooth and is not load-bearing. For instance, conventional aircraft cargo handling systems that employ a series of floor-mounted rollers to allow pallets to be moved within the airplane is not suitable for ISO containers.

Conventional cargo pallets and containers, such as those disclosed in Iversen, are restrained within the transport vehicle by a system of rails and locks that engage detents in the pallet or platform. These conventional systems (and variations on them) will not work with the geometry of the ISO container. Systems used in ships, trucks, and trains for restraining ISO containers are designed to engage the ISO container as it is lowered vertically from above. With respect to aircraft, this technique is unsuitable for aircraft that have no opening above the cargo deck such that loading from above and using existing restraint systems is not possible.

Furthermore, conventional cargo handling systems that utilize pallets and platforms impose a large weight penalty for transport vehicles. The weight penalty must take into consideration the weight of the cargo handling system as well as the additional weight of the vehicle structure to support the cargo. Thus, a smaller weight penalty is desired, such as for container-carrying aircraft, where excess weight has a negative impact on fuel efficiency and aircraft operating cost.

It would therefore be advantageous to provide an improved cargo handling system that is capable of transporting cargo into and within a transport vehicle. In addition, it would be advantageous to provide a cargo handling system that is effectively restrained within the transport vehicle. It would also be desirable to provide a cargo handling system that requires a reduced amount of time and workforce to load and/or unload the cargo into and/or out of the transport vehicle. It would be further desirable to provide a cargo handling system that does not increase the weight penalty on the transport vehicle, as well as a compact cargo handling system that reduces the size, weight, and surface area required to accommodate the cargo within the transport vehicle.

BRIEF SUMMARY OF THE INVENTION

The present invention addresses the above needs and achieves other advantages by providing a cargo handling system that is capable of efficiently and effectively transporting cargo containers between a loading dock and a transport vehicle. The system is capable of providing accurate alignment of the loading dock and transport vehicle. In addition, the system provides railcars that transport cargo containers between the loading dock and transport vehicle, as well as pylons positioned within the cargo bay of the transport vehicle that operate to elevate the cargo containers so that the railcars may be removed from the transport vehicle. Thus, the railcars may be pre-loaded with cargo containers on the loading dock such that an entire payload of cargo containers may be simultaneously loaded onto the transport vehicle and vice versa. Moreover, the system provides a variety of mechanisms and sensors that ensure that the cargo containers are both aligned and adequately secured within the cargo bay of the transport vehicle.

In one embodiment of the present invention, a system for aligning a loading dock and a transport vehicle for loading and unloading cargo is provided. The system includes a transport vehicle having a cargo bay, and a stationary loading dock including an end for coupling to the cargo bay. The system also includes a mechanism that is operable to adjust the height of the transport vehicle or the loading dock to align the loading dock and the transport vehicle for loading and unloading of cargo.

In various aspects of the system, the mechanism includes a plurality of actuators and sensors, wherein the sensors are capable of detecting differences in height between the loading dock and the transport vehicle, and the actuators are operable to adjust the height of the loading dock. The mechanism could also include landing gear and a plurality of sensors, where the sensors are operable to detect height changes of the transport vehicle, and the landing gear is operable to adjust the height of the transport vehicle in response to input from the sensors. Further, the mechanism may include a plurality of jacks located within the transport vehicle and operable to adjust the height of the transport vehicle. The mechanism could alternatively include a plurality of jacks located within an apron, wherein the apron is positioned below the transport vehicle, and the jacks are operable to adjust the height of the transport vehicle.

Another embodiment of the present invention provides a system for aligning a loading dock and a transport vehicle for loading and unloading cargo. The system includes a loading dock having a plurality of engagement members defined in an end of the loading dock, and a transport vehicle comprising a plurality of engagement members proximate to a cargo bay. The engagement members of the loading dock and transport vehicle are capable of engaging one another to align the cargo bay and the end of the loading dock. In one aspect, the engagement members of the loading dock include a plurality of blades, and the engagement members of the transport vehicle include a plurality of slots. The blades could be operable to engage the slots of the cargo bay to align the cargo bay and the end of the loading dock.

The present invention also provides a railcar for transporting cargo containers. The railcar includes a chassis having opposed lateral edges extending between first and second ends. In one embodiment, the chassis is approximately the length of a cargo bay of a transport vehicle, and the distance between the opposed lateral edges is approximately the width of the cargo container. A plurality of pads are spaced along the opposed lateral edges of the chassis, wherein the pads are capable of supporting a cargo container. The railcar further includes a plurality of registration members, wherein at least one of the registration members extends outwardly from a respective pad and is capable of engaging the cargo container. The railcar includes a plurality of wheels positioned along the opposed lateral edges and between the pads, wherein the wheels are capable of engaging a pair of rails and transporting the railcar along the rails.

In variations of the railcar, the cargo container includes a corner fitting at each corner of the cargo container, and each registration member is capable of engaging a respective corner fitting. Each of the registration members may be a tapered pin. The pads may be approximately the same size as a bottom surface of the corner fitting, and the pads could be positioned proximate to each of the first and second ends of the chassis and approximately midway between the first and second ends. Moreover, each of the pads could be operable to elevate the cargo container.

The railcar may further include a mechanism for propelling the railcar along the rails. For example, the mechanism could be a winch coupled to the railcar and a power source external to the railcar, a motor housed within the railcar and driven by a power source external to the railcar, or a motor housed within the railcar and driven by a power source internal to the railcar.

In a further embodiment of the present invention, an apparatus for positioning at least one cargo container within a transport vehicle is provided. The apparatus includes a pylon having at least one slot and operable to raise and lower the cargo container, and at least one restraint pin positioned within the pylon and operable to extend and retract within the slot to engage and disengage the cargo container. In one variation of the apparatus, each restraint pin includes a sensor operable to determine whether the restraint pin is engaged or disengaged with the cargo container.

In aspects of the apparatus, each of the restraint pins extends laterally within a respective pylon and is capable of engaging a corner fitting of the cargo container. Each restraint pin could include a hydraulic cylinder and hydraulic piston operable to extend and retract within the pylon. The pylon may be operable to raise and lower each of the restraint pins such that when each of the restraint pins engages a corner fitting, the pylon and restraint pins are capable of cooperatively raising and lowering the cargo container. Similar to the restraint pins, the pylon may include a hydraulic cylinder for raising and lowering each of the restraint pins and cargo container. Furthermore, the pylon may include a plurality of slots, wherein each of a pair of slots is defined in opposed surfaces of the pylon. Each restraint pin may extend and retract within each of the pair of slots, and the slots could extend longitudinally within the pylon such that each of the restraint pins may slide within the slots.

The present invention provides a system for cargo container handling. The system includes a transport vehicle having a cargo bay capable of housing a plurality of cargo containers. In one embodiment, the transport vehicle is an aircraft having a swing nose for exposing the cargo bay. The system also includes a loading dock having an end for coupling to the cargo bay and capable of supporting a plurality of cargo containers. The system includes at least one railcar that is capable of carrying a portion of a cargo container or several cargo containers between the loading dock and cargo bay while traveling along rails positioned on the loading dock and within the cargo bay. In one aspect of the system, a plurality of rows of railcars are arranged in parallel on the loading dock, wherein each row of railcars includes a plurality of interconnected railcars that are capable of loading and unloading a plurality of cargo containers to and from the transport vehicle simultaneously. The system further includes a plurality of pylons positioned along a floor of the cargo bay, wherein a predetermined number of pylons are cooperatively operable to elevate and lower a cargo container within the cargo bay. One embodiment of the system provides a pylon positioned proximate to each corner along a bottom surface of each cargo container, wherein each pylon is capable of engaging respective corner fittings of each cargo container.

Variations of the system recite that the cargo bay includes an upper and lower deck, wherein the loading dock comprises an upper and lower dock that align with respective upper and lower decks of the cargo bay. Each of the upper and lower docks of the loading dock is typically at least as long as each of the upper and lower decks of the cargo bay. The system preferably includes a plurality of ceiling locating pins extending from the cargo bay that are capable of engaging respective corner fittings of a cargo container when the pylons elevate the cargo container. The ceiling locating pins are typically tapered and capable of being extended and retracted. In facilitate extension and retraction, the ceiling locating pins may include a spring-loaded or hydraulic mechanism.

Furthermore, the present invention provides a method for cargo container handling. The method includes loading a plurality of cargo containers onto a plurality of railcars, such as with an overhead crane, wherein the railcars are arranged on a loading dock in a predetermined configuration. The method includes positioning a cargo bay of a transport vehicle adjacent to a loading dock, which could include adjusting the height of the loading dock or transport vehicle. The method also includes transporting the cargo containers with the railcars from the loading dock and into the cargo bay, and elevating the cargo containers within the cargo bay. The method further includes removing the railcars from the cargo bay while the cargo containers are secured within the cargo bay in an elevated position.

In alternatives of the method, elevating includes extending a plurality of restraint pins to engage respective corner fittings of the cargo containers, wherein the restraint pins are positioned within a plurality of respective pylons arranged on a floor of the cargo bay. The method typically includes elevating the cargo containers with the pylons while the restraint pins are engaged within the corner fittings. The method could include elevating the cargo containers such that a plurality of corner fittings of the cargo containers engage a plurality of ceiling locating pins. Additionally, the method could include elevating the cargo containers with a plurality of pads positioned on each of the railcars.

The present invention provides an additional method for cargo container handling. The method includes positioning a cargo bay of a transport vehicle adjacent to a loading dock, and transporting a plurality of railcars from the loading dock and into the cargo bay. The method also includes lowering a plurality of cargo containers onto the railcars, removing the railcars and cargo containers from the cargo bay, and removing the cargo containers from the railcars. In one aspect of the method, the method includes lowering the cargo containers with a plurality of pads positioned on the railcars, wherein the pads are operable to engage and lower each of the cargo containers. In a further aspect, the method includes lowering the cargo containers with a plurality of pylons positioned along a floor of the cargo bay, wherein the pylons are operable to engage and lower each of the cargo containers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
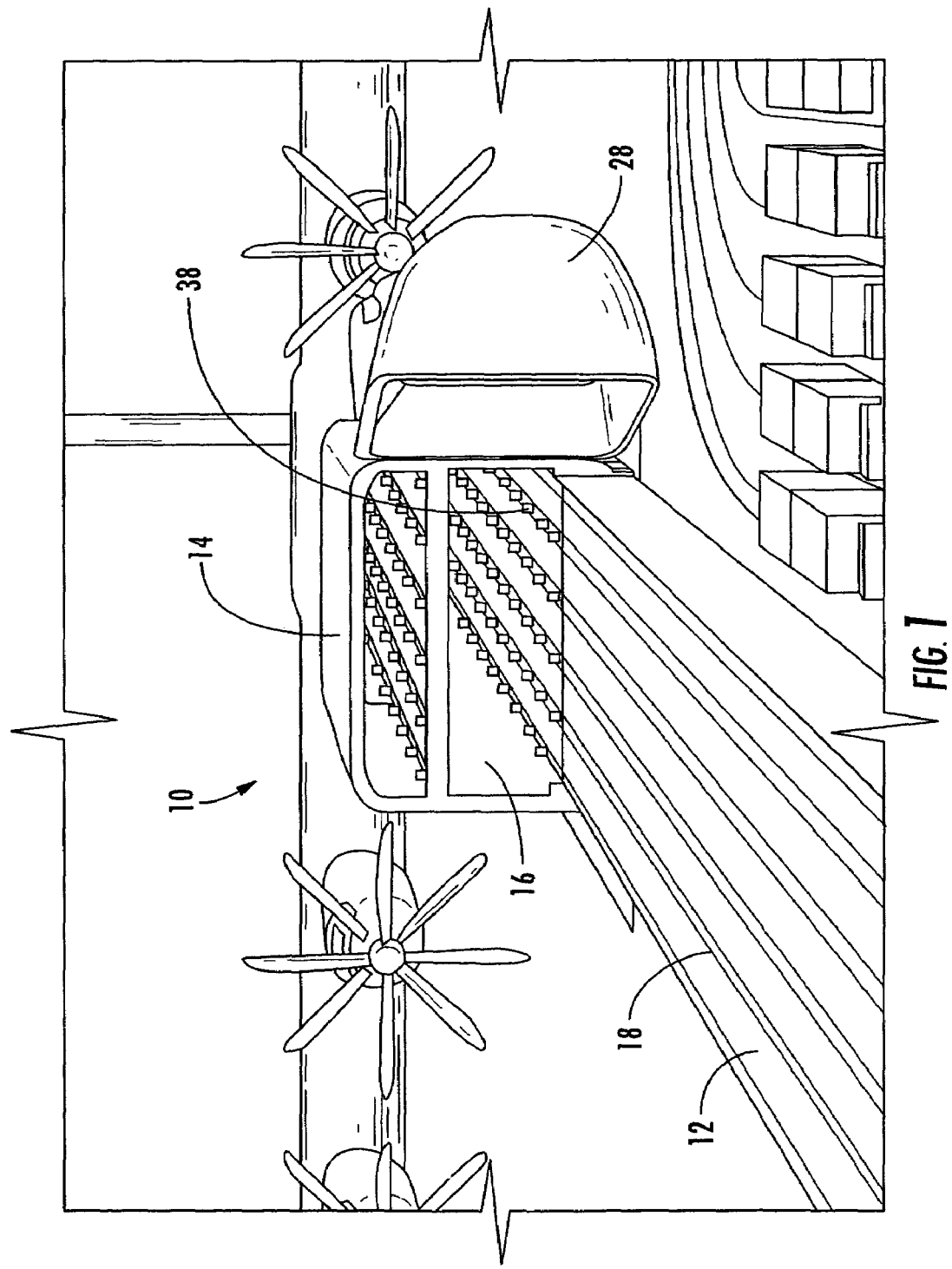
FIG. 1 is a perspective view of a loading dock and aircraft of a cargo handling system according to one embodiment of the present invention.
Figure 2:
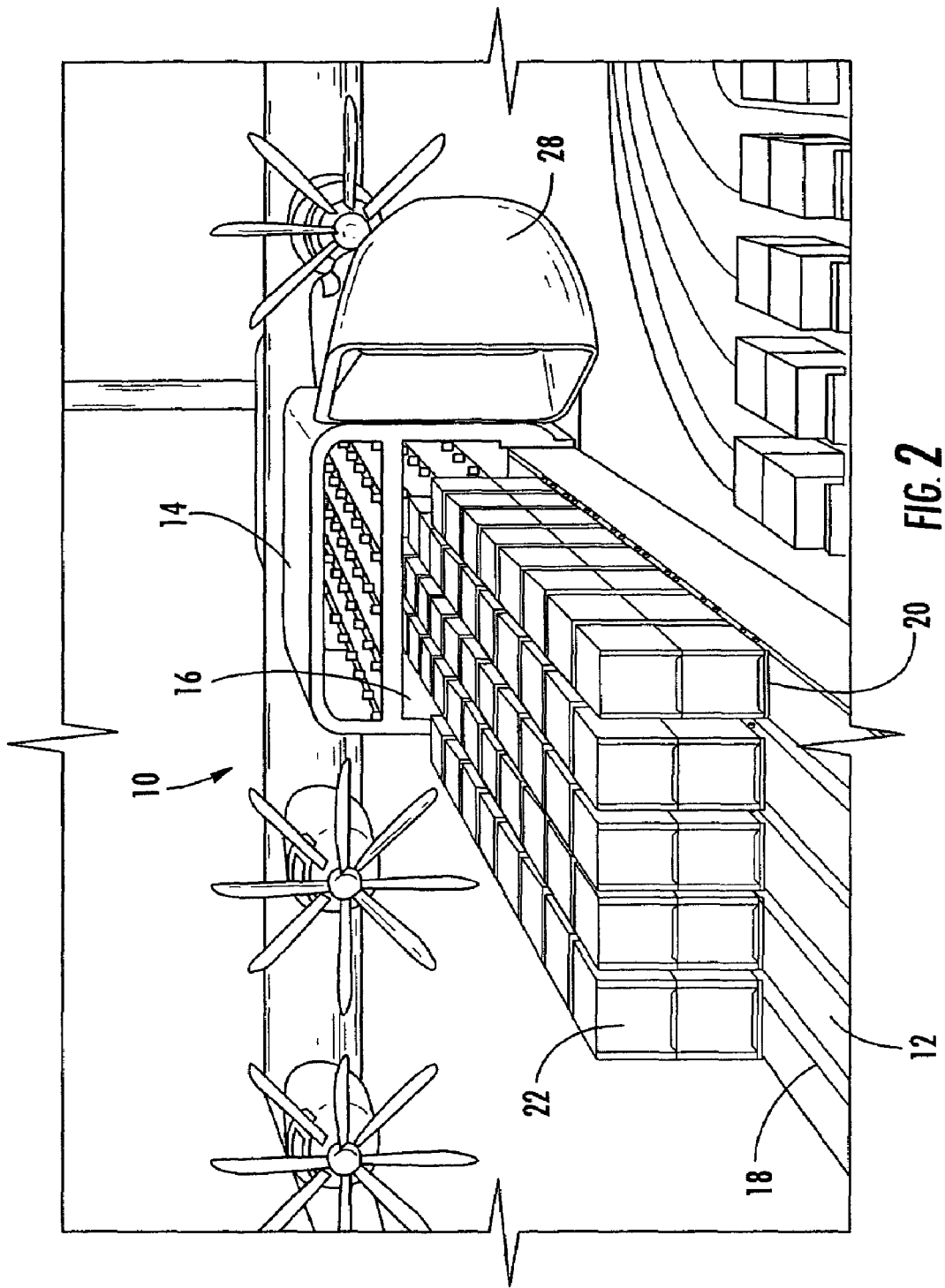
FIG. 2 is a perspective view of cargo being transported from the loading dock into a lower deck of the aircraft of the cargo handling system shown in FIG. 1.

Referring to FIGS. 1 and 2, a cargo handling system 10 according to one embodiment of the present invention is shown. The cargo handling system 10 generally includes a loading dock 12 that is aligned with a transport vehicle 14. Both the loading dock 12 and cargo bay 16 of the transport vehicle 14 include a series of parallel rails 18 that enable railcars 20 to transport cargo containers 22 from the loading dock and into the cargo bay and vice versa. The cargo containers 22 are located on the loading dock 12 or within the transport vehicle 14 in one or more longitudinal rows, on one or more decks or levels. As illustrated in FIG. 2, all of the cargo containers 22 positioned on the railcars 20 located on the loading dock 12 may be transported into the cargo bay 16 such that the entire cargo bay is capable of being loaded in one step.

Figure 3:
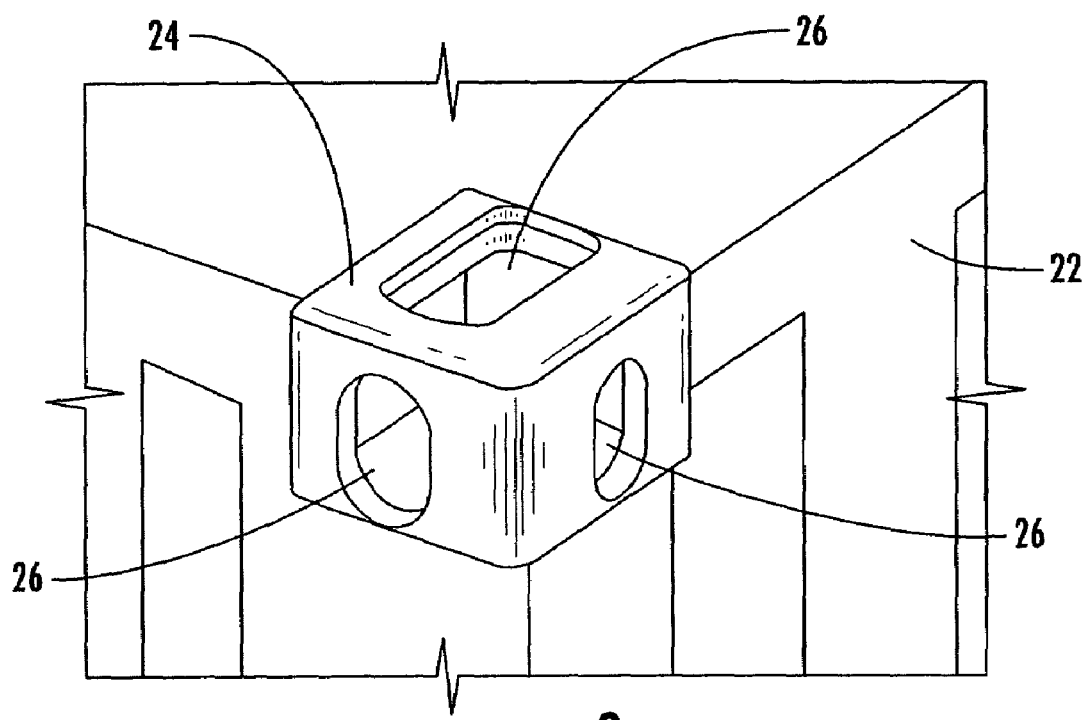
FIG. 3 is perspective view of a corner of an ISO container according to one embodiment of the present invention.

As used herein, the cargo container 22 is preferably an ISO container as known to those skilled in the art. ISO containers are typically standard sizes to allow for interchangeability and functionality within cargo handling systems. For example, typical ISO containers are 20 or 40 feet in length and 8 feet in width. FIG. 3 shows a corner fitting 24 of a typical ISO container, where each corner fitting includes three holes 26 that are located at each of the eight corners of the ISO container. The holes 26 facilitate handling of the ISO containers in the cargo handling system 10, as will be explained in further detail below. Although reference has been made to specific dimensions and configurations of ISO containers, it is understood that the ISO containers could be various sizes and configurations designed for a particular specification or application. In addition, although ISO containers are preferred for the cargo handling system 10 disclosed herein, it is understood that the cargo handling system is capable of handling various cargo containers 22. Thus, the cargo containers 22 could be any suitable container for transporting cargo and, for instance, the cargo containers could be placed on pallets or a similar support device. As used herein, the cargo containers 22 may be referred to generally as cargo, payload, or cargo payload, which could include a single cargo container or several containers.

The transport vehicle 14, as shown in FIGS. 1 and 2, is an aircraft and could be, for example, a ground effect aircraft as known to those skilled in the art. The aircraft includes a swing nose 28 that exposes the cargo bay 16 of the aircraft and allows the floor of the cargo bay to be aligned with the loading dock 12. Thus, the swing-nose door 28 opens to provide full-width and full-height access to the cargo bay 16. To onload or offload cargo containers 22, the aircraft mates its open forward fuselage with a loading dock 12. Examples of ground effect aircraft are disclosed in U.S. Pat. No. 6,547,181 entitled "Ground Effect Wing Having a Variable Sweep Winglet," and U.S. Pat. No. 6,848,650 entitled "Ground Effect Aircraft," each of which is assigned to the present assignee and incorporated herein by reference.

Although the aircraft is shown having a swing-nose door 28 that opens laterally, it is also possible to load the aircraft through a swing-nose door that opens vertically, or through an aft cargo door or a similar door as long as there is full-width access to the cargo bay 16. The aircraft could also have a swing tail that swings open to access the fuselage from the rear of the aircraft, or a wing door or tip that could swing open. Furthermore, although reference is made herein to ground effect aircraft, it is understood that the transport vehicle 14 could be any suitable vehicle having the capability of transporting cargo containers 22. For example, the transport vehicle 14 could be a ship, train, or truck having suitable capacity and transportation capabilities for accommodating and transporting the cargo containers 22. Similarly, although reference is made to a "cargo bay" 16, the cargo bay should not be limited to aircraft, as the cargo bay may be any suitable bay or deck within a transport vehicle 14 that is capable of receiving cargo containers 22 from railcars 20. Furthermore, although FIGS. 1 and 2 illustrate a transport vehicle including two decks within the cargo bay 16, it is understood that the cargo bay may have one or more decks.

The loading dock 12 is preferably stationary and is approximately the same width as the floor of the cargo bay 16. The loading dock 12 is located at the boundary between the transport vehicle 14 area (taxiway) and the cargo handling area. One end of the loading dock 12 mates to the transport vehicle 14 such that the full width of the cargo bay 16 is joined to the full width of the loading dock. The elevation of the loading dock 12 is preferably equal to the elevation of the floor of the cargo bay 16, and the surface of the loading dock is approximately parallel to the floor of the cargo bay. As used herein, the loading dock 12 is geographically stationary. Thus, the loading dock 12 is not significantly mobile, aside from the adjustments that may be required to properly align the loading dock and the transport vehicle 14 (described below). Although the loading dock 12 is preferably stationary, it is understood that the loading dock could be mobile for various cargo handling systems.

The loading dock 12 has as many levels or decks as the transport vehicle 14 (the upper loading dock is omitted in FIGS. 1 and 2 to provide a clearer view of the cargo bay 16). Each loading dock level is co-planar with its respective aircraft cargo floor. Each loading dock 12 level also has two or more rails 18 per row of cargo containers 22. The rails 18 on the loading dock 12 are coaxial with the rails inside the transport vehicle 14 such that railcars 20 ride on the rails between the loading dock 12 and the cargo bay 16. In addition, the cargo containers 22 are oriented longitudinally and parallel to the longitudinal axis of the loading dock 12 and the transport vehicle 14, although the cargo containers could be oriented in other directions for other applications. The loading dock 12 is preferably of sufficient length that the full length of the cargo containers 22 can be brought out onto the loading dock simultaneously or substantially at the same time. Preferably, this full length is accessible from above for transfer to other transport modes.

Figure 21:
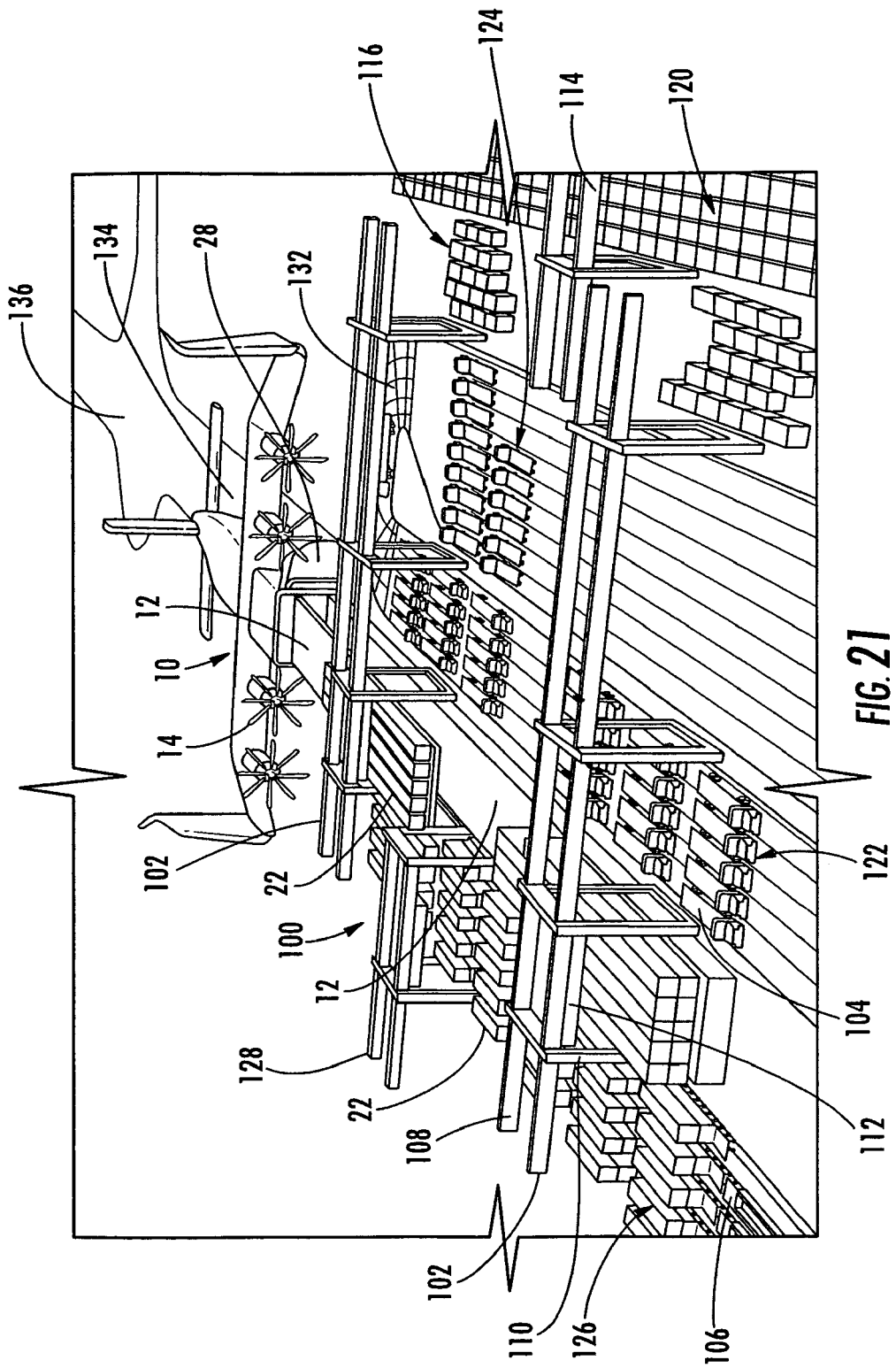
FIG. 21 is a perspective view of a cargo port system according to one embodiment of the present invention.

As described above, the loading dock 12 may have more than one level of docks, where each level corresponds to each level of a transport vehicle 14 having more than one cargo deck in the cargo bay 16. In a multiple level loading dock 12, the highest level would be approximately as long as the transport vehicle 14 cargo deck. The next lower level of the loading dock 12 would pass below this upper deck to an area open from above, also approximately as long as the aircraft cargo deck (thus the lower dock would be approximately twice as long as the upper dock). Providing loading docks 12 and cargo decks of the same length enable the entire payload of cargo containers 22 to be unloaded and loaded in a single operation. FIG. 21, which is described below, illustrates a double-level loading dock 12 and a double-deck cargo bay 16.

The loading dock 12 provides several functions in the cargo handling system 10. For instance, the loading dock 12 provides a location for cargo containers 22 to be arranged (or staged) in the correct order and orientation. This staging permits the cargo containers 22 to be brought to the loading dock 12 with less urgency with respect to timing since the transport vehicle 14 is not required to wait during the process of staging the cargo containers on the dock. In addition, the loading dock 12 provides support and guidance for the railcars 20 described below. The loading dock 12 can be aligned with the transport vehicle 14 for more easily transporting cargo containers 22 between the loading dock and the transport vehicle. Moreover, the loading dock 12 provides a location for cargo containers 22, recently removed from the transport vehicle 14, to be transferred or distributed to other transport modes. Therefore, the combination of staging the cargo containers 22 on the loading dock 12 and providing a location for subsequent distribution enables a more rapid unloading of the transport vehicle 14 to be followed by a less urgent removal of the loads from the dock. As a result, the time required for the transport vehicle 14 to be grounded is reduced, which results in increased utilization of the transport vehicle.

There may be instances where the loading dock 12 does not properly align with the floor of the cargo bay 16, which results in problems in alignment of the rails 18 and transporting the railcars 20 between the loading dock and the cargo bay. The landing gear system of a transport vehicle 14 has a suspension system that provides for wheel deflection for changes in force. As the weight of the transport vehicle 14 varies, it may be that the height of the transport vehicle varies, disturbing the precise alignment between the transport vehicle and the loading dock 12. Various techniques may be employed to adjust the height of the loading dock 12 or transport vehicle 14, or mechanisms may be utilized to ensure the loading dock and cargo bay are properly aligned.

For instance, the loading dock 12 may be positioned on a system of actuators that are controlled by sensors. As the height of the transport vehicle 14 varies with load, sensors detect this change and direct the actuators to maintain the height relationship between the loading dock 12 and transport vehicle. In addition, the extension of the landing gear of the transport vehicle 14 may be variable and under the control of sensors. As the height of the transport vehicle 14 varies with load, sensors detect this change and direct the landing gear to maintain the height relationship between the loading dock 12 and the transport vehicle.

Figure 4:
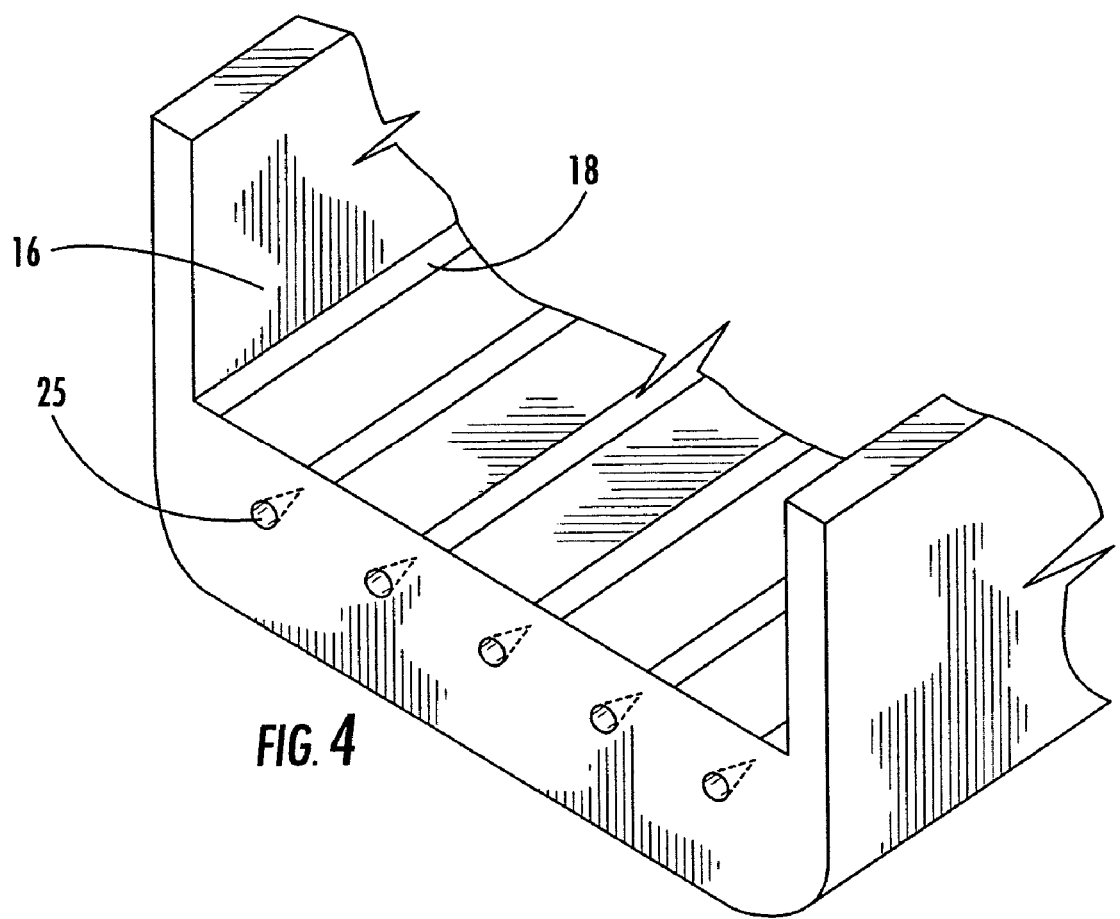
FIG. 4 is a partial perspective view of a cargo bay illustrating holes for receiving pins according to one embodiment of the present invention.
Figure 5:
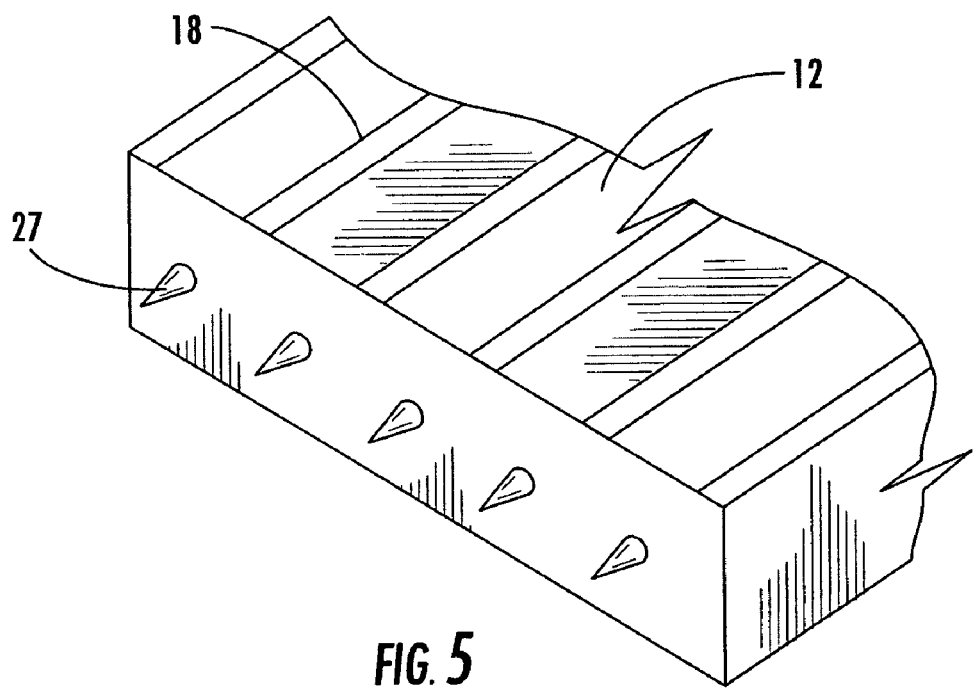
FIG. 5 is a partial perspective view of a loading dock showing pins for engaging the holes shown in FIG. 4 according to one embodiment of the present invention

Another technique employs a series of engagement members to align and mechanically connect the transport vehicle 14 and loading dock 12 and is illustrated in FIGS. 4 and 5. Variations in transport vehicle 14 load from the container payload are compensated by the load imposed by the mechanical connection to the loading dock 12. For example, pins 27 may lock the forward end of the transport vehicle 14 to the loading dock 12 so that at least the nose end of the transport vehicle aligns with the loading dock. The pins 27 could be a series of fixed tapered pins that protrude from the mating face of the transport vehicle 14. The pins 27 fit into fixed tapered holes 25 in the mating face of the loading dock 12 such that small errors present in the pre-alignment phase are accommodated by the tolerance of the smaller tip of the tapered blade in the larger end of the tapered slot. Alignment compliance is provided laterally primarily by flexibility in the landing gear tires of the transport vehicle 14, while vertical compliance is provided by landing gear suspension travel, or by an active system such as described herein.

Figure 6:
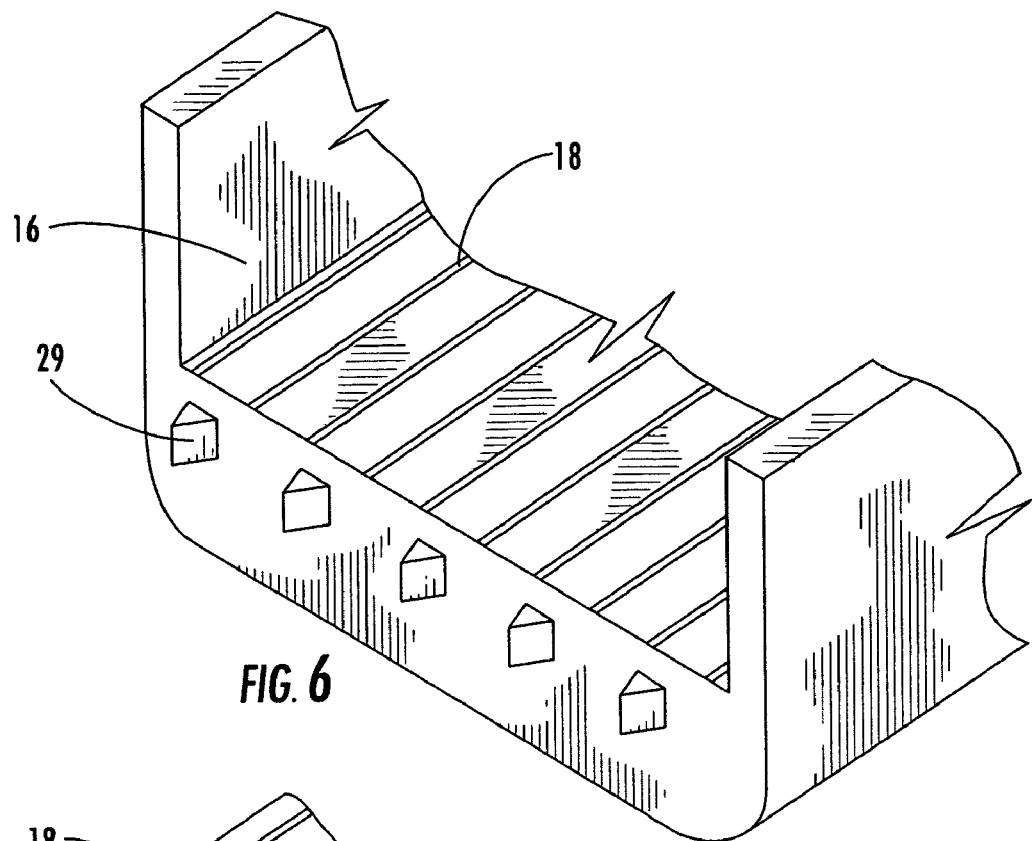
FIG. 6 is a partial perspective view of a cargo bay illustrating blades according to one embodiment of the present invention.
Figure 7:
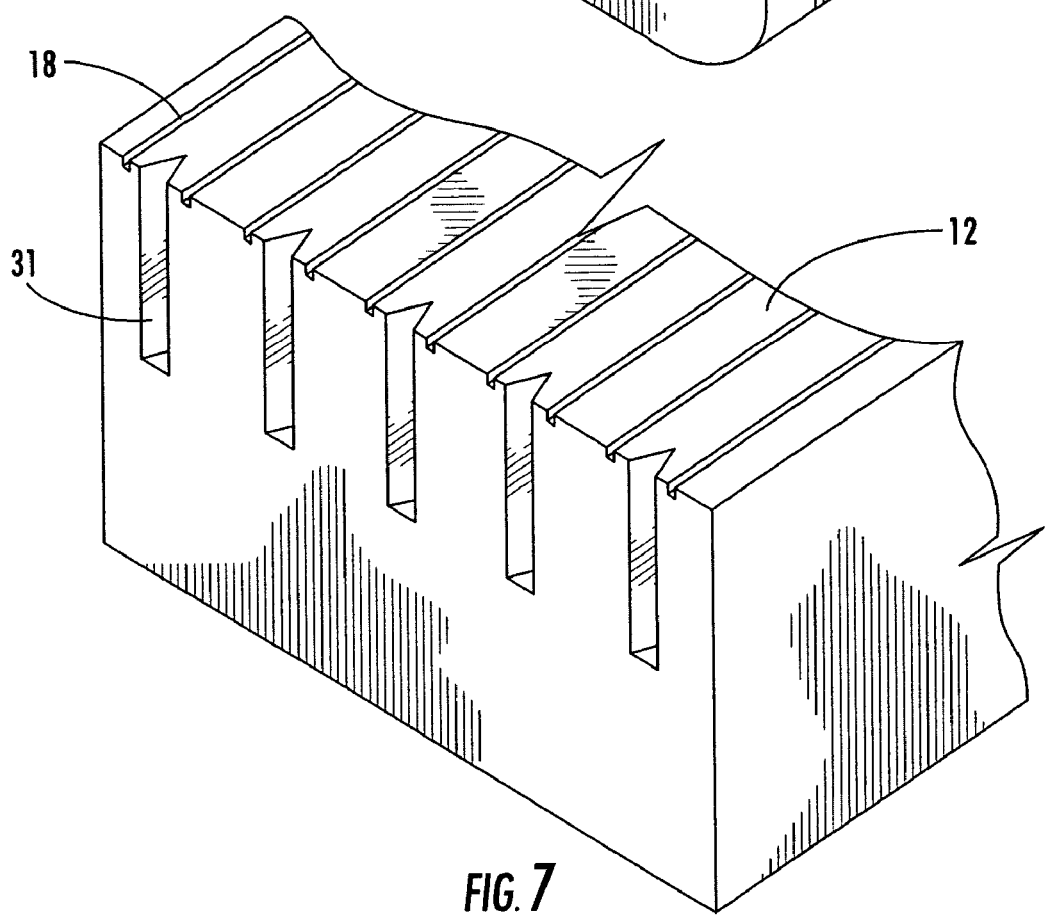
FIG. 7 is a partial perspective view of a loading dock showing slots for receiving the blades shown in FIG. 6 according to one embodiment of the present invention.

Alternatively, the loading dock 12 may include blades 29 that engage slots 31 in the transport vehicle 14, as shown in FIGS. 6 and 7. As the transport vehicle 14 mates with the loading dock 12, engagement of the tapered blades 29 and slots 31 forces alignment between the vehicle and the dock. The length of the slots 31 is greater than the length of the blades 29 to allow for vertical adjustment of the loading dock 12 and/or transport vehicle 14. Thus, a loading dock 12 incorporating slots 31 would enable vertical adjustment of the transport vehicle 14 including blades 29 using mechanisms such as mechanical jacks 33, as described below. An alternative system could use a series of movable pins or plates attached to the loading dock 12 that engage the transport vehicle 14 and are then moved such that the transport vehicle is brought into alignment with the loading dock.

Figure 8:
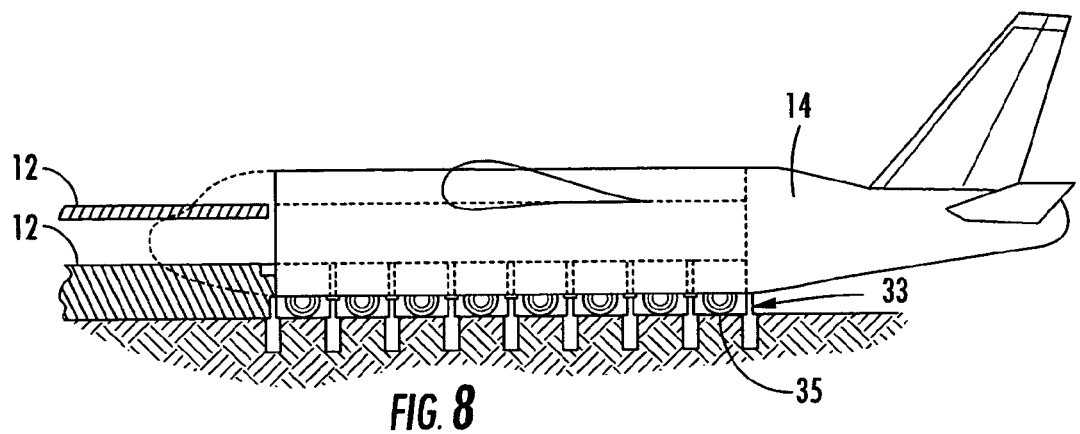
FIG. 8 is a side view of a system for aligning a transport vehicle with a loading dock according to one embodiment of the present invention.
Figure 9:
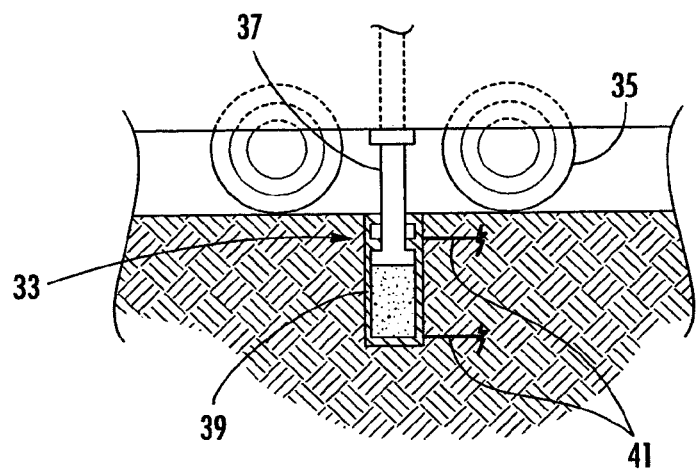
FIG. 9 is an enlarged side view of a jack employed with the system shown in FIG. 8.
Figure 10:
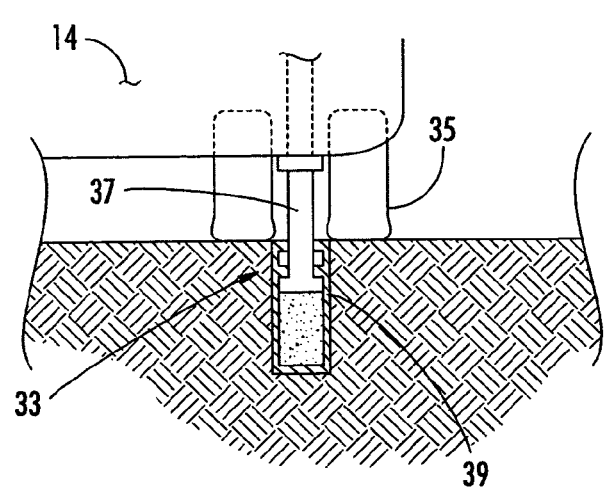
FIG. 10 is an enlarged front view of the jack shown in FIG. 9 and employed with the system shown in FIG. 8.

Furthermore, the apron beneath the docked transport vehicle 14 may incorporate a series of extensible mechanical jacks 33 that raise the transport vehicle to extend the landing gear 35 so that the vertical location of the transport vehicle is independent of load. Thus, the transport vehicle 14 rests firmly on the jacks 33 but may also be supported by the landing gear 35. FIG. 8 illustrates that a series of jacks 33 are arranged within the apron adjacent to a docked transport vehicle 14. The jacks 33 are generally positioned between the wheels of the landing gear 35, although the jacks could be positioned at various locations on the underside of the transport vehicle 14. FIGS. 9 and 10 demonstrate that each jack 33 includes a hydraulic piston and rod 37 that operates in conjunction with a hydraulic cylinder 39. Hydraulic fluid is provided in lines 41 such that forcing fluid within the cylinder 39 causes the piston and rod 37 to exert a force on the underside of the transport vehicle 14. Similarly, withdrawing fluid from the lines 41 and cylinder 39 causes the piston and rod 37 to reduce the force on the transport vehicle 14, causing the height of the transport vehicle to be reduced. As a result, the cooperation of the jacks 33 causes height adjustment of the landing gear 35 when required to align the cargo bay 16 with the loading dock 12. Thus, the jacks 33 may be similar in concept to the hydraulic hoists used in automobile repair shops. Incorporating the jacks 33 into the apron is preferred because it imposes little weight or structural penalty on a transport vehicle 14, such as an aircraft, and provides more precise registration independent of cargo load or wind condition. In another aspect of the present invention, the transport vehicle 14 may incorporate a series of mechanical jacks that extend from the transport vehicle to raise the transport vehicle to extend the landing gear so that the vertical location of the transport vehicle is independent of its weight or other external factors, such as wind.

The upper surface of the loading dock 12 is approximately planar and level. The surface is defined principally by a series of parallel rails 18 that guide the railcars 20. These rails 18 provide vertical support and lateral restraint while permitting longitudinal motion. The cross-sectional configuration of the rail 18 may be any suitable configuration for guiding the railcars 20. At least one rail 18 is used for each longitudinal line of cargo containers 22 and row of railcars 20. Two rails 18 provide restraint in the railcar 20 roll axis, and the pitch attitude of the railcars is constrained by longitudinal spacing of the rail car wheels 30. Yaw attitude of the railcars 20 is constrained by the engagement of the wheels 30 with the rails 18 and the longitudinal spacing of the wheels. It is not essential that the upper surface of the loading dock 12 include any more structure than the rails 18, however, it may be advantageous to fill in the upper loading dock surface between the rails to provide a walking surface for attending to the cargo containers 22 or railcars 20. Moreover, the railcars 20 typically roll only on straight rails 18, although there may be situations when curved rails are advantageous, such as when a facility wishes to consolidate numerous cargo handling systems at a single location.

As described above, railcars 20 support and transport the cargo containers 22 between the loading dock 12 and the cargo bay 16. Each railcar 20 is about the same width as the container, while the railcar may be various lengths. The railcar 20 can be as long as the entire aircraft cargo bay 16, or some integer multiple or fraction of the length of the cargo container 22 spacing within the cargo bay. The design of 20-ft and 40-ft ISO containers is such that two 20-ft containers fit within the space of a 40-ft container with a small gap between them. The spacing of ISO containers within the cargo bay 16 is such that 20-ft and 40-ft containers can be located at 20-ft intervals. For instance, a single railcar 20 could carry four 20-ft ISO containers at the correct spacing, or two 40-ft ISO containers. Or, a single railcar 20 could carry only one-half of a 20-ft ISO container so that two railcars would be required to carry a single 20-ft container. In the event that more than one railcar 20 is needed to load an entire row of cargo containers 22 into the transport vehicle 14 (the railcar is shorter than the cargo area), the railcars may be connected to form a "train" of railcars. Furthermore, the railcar 20 is designed to carry the cargo containers 22 at a low height above the floor of the cargo bay 16. Traveling at a low height permits a cargo volume that is low in height, saving transport vehicle size, weight, and surface area.

Figure 11:
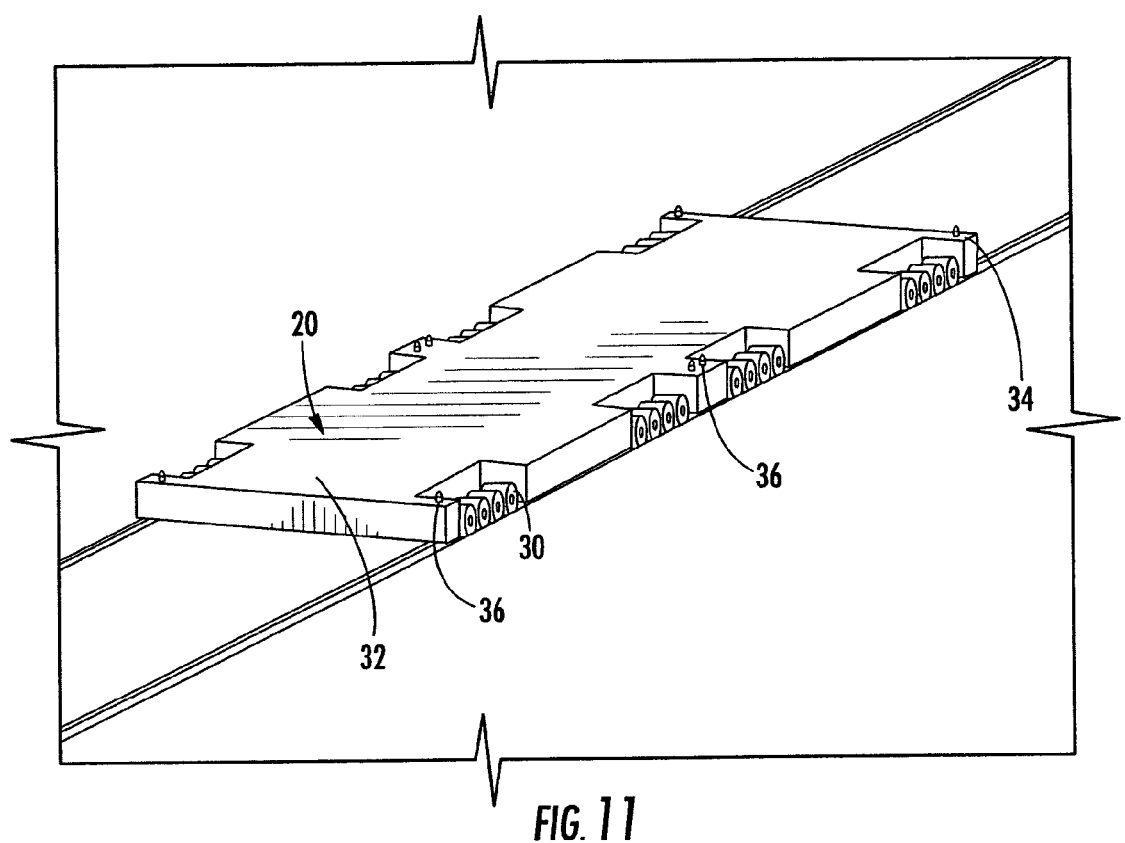
FIG. 11 is a perspective view of a railcar for transporting ISO containers according to one embodiment of the present invention.
Figure 12:
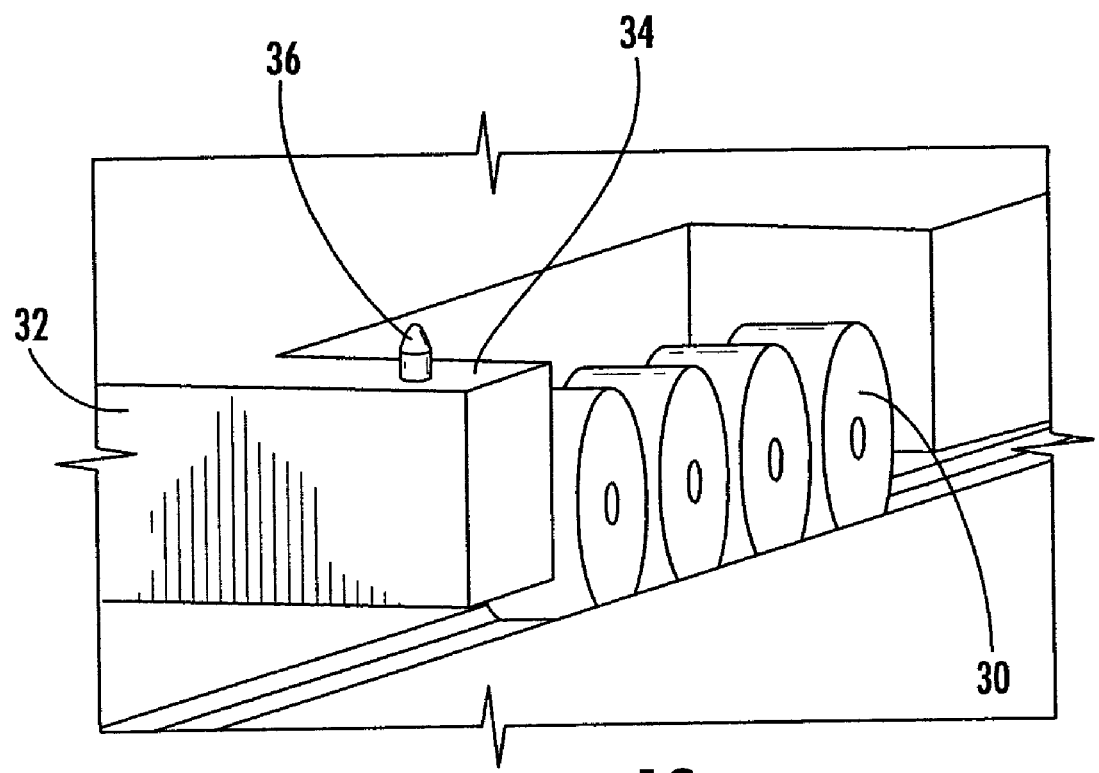
FIG. 12 is an enlarged perspective view of railcar wheels, a pad, and a tapered pin of the railcar shown in FIG. 11.

As shown in FIGS. 11 and 12, the railcars 20 roll on wheels 30 that travel within rails 18 on the loading dock 12 and in the transport vehicle 14. The wheels 30 are constrained by their cross-sectional shape in conjunction with the cross-sectional shape of the rails 18 so that the wheels cannot move laterally. The wheels 30 are connected to a railcar chassis 32 such that the wheels may rotate about their axes and such that the load imposed on the wheels by the rails 18 are transferred into the chassis. One or more wheels 30 is located at least near the four corners of the chassis 32, which provides the railcar 20 and its payload with stability in the roll (tip-over), pitch, and yaw axes. The railcar 20 shown in FIG. 11 includes groups of four wheels 30 spaced along each lateral edge of the railcar, but only a single wheel is required to be located near each corner of each railcar. Thus, any number of wheels 30 may be employed with the railcar 20, and it is possible to interconnect railcars so that a pair of wheels is shared between two railcars. However, in order for the railcars 20 to carry sufficient payload weight, numerous wheels may be required. The railcars 20 are configured to carry the cargo containers 22 at a low height above the floor of the cargo bay 16, and the wheels 30 must fit between the rails 18 and the bottom of the cargo containers. For these reasons, the wheels 30 are preferably small in diameter.

Although the wheels 30 have been referred to herein as being connected to a chassis 32 of a railcar, it is understood that the wheels could be arranged within the rails 18 of both the loading dock 12 and cargo bay 16. Thus, the railcars 20 or pallets could include rails 18 or tracks that ride along and engage wheels 30. Additionally, the railcars 20 or pallets could simply ride along the wheels 30 located on the loading dock 12 and cargo bay 16 such that rails or a similar track is not required.

The chassis 32 supports each cargo container 22 vertically at the four lower corners of each container with pads 34, as depicted in FIGS. 11 and 12. The pads 34 are approximately level (parallel to the loading dock) and are of the same approximate size as an ISO container corner fitting 24 as shown in the top view of FIG. 3. Preferably, the wheels 30 are located near pads 34 (described below) in order to provide an efficient, strong, and rigid load path between the payload and the wheels. As shown in FIG. 11, pads 34 may be positioned proximate to each of the four corners of the chassis 32 and approximately midway along the lateral edges of the railcar 20. However, it is understood that FIG. 11 is exemplary and that various numbers of pads 34 may be employed with the railcar 20 and still be within the scope of the present invention.

Lateral and longitudinal restraint of the cargo container 22 is provided by vertical registration pins 36 extending from the pads 34 that engage the standard hole 26 in each corner fitting 24 in the bottom face of the ISO container. As shown in FIG. 12, the registration pins 36 may be tapered to provide precise alignment when loading the cargo container 22 onto the railcar 20 while allowing for some misalignment in the initial mating process. FIG. 11 demonstrates that each pad 34 includes a single registration pin 36 extending therefrom. However, a single pad 32 may include more than one registration pin 36. For instance, FIG. 11 shows that the pads 34 positioned approximately midway along the lateral edges of the railcar 20 include a pair of registration pins 36. The pads 34 are approximately twice as long as the pads positioned at the corners of the chassis 32. Thus, the railcar 20 shown in FIG. 11 could accommodate a pair of ISO containers arranged in series on the chassis 32.

It is understood that the registration pins 36 are not meant to be limiting, as there could be various registration members employed to engage the cargo container 22. For example, each pad 34 at a respective corner of the railcar 20 could include a flange extending therefrom that engages the outer corner faces of the corner fitting 24. Thus, the flange could extend vertically and slightly outboard to funnel the cargo container 22 to the pads 34 and onto the railcar 20. Moreover, each lateral edge of the flange could include a notch to clear restraint pins 40 or other mechanisms that engage the corner fittings 24 and raise the cargo container 22, as described in greater detail below.

The railcars 20 load and unload containers from the transport vehicle 14. To overcome inertia, friction, and gravitational force arising from slight grades in the loading dock 12 or floor of the cargo bay 16, a mechanism for propelling the railcar may be required. Several techniques may be utilized to propel the railcar 20. For instance, an external winch, internal motor with external power, internal motor with internal power, or any other suitable technique known to those skilled in the art could be employed.

Figure 13:
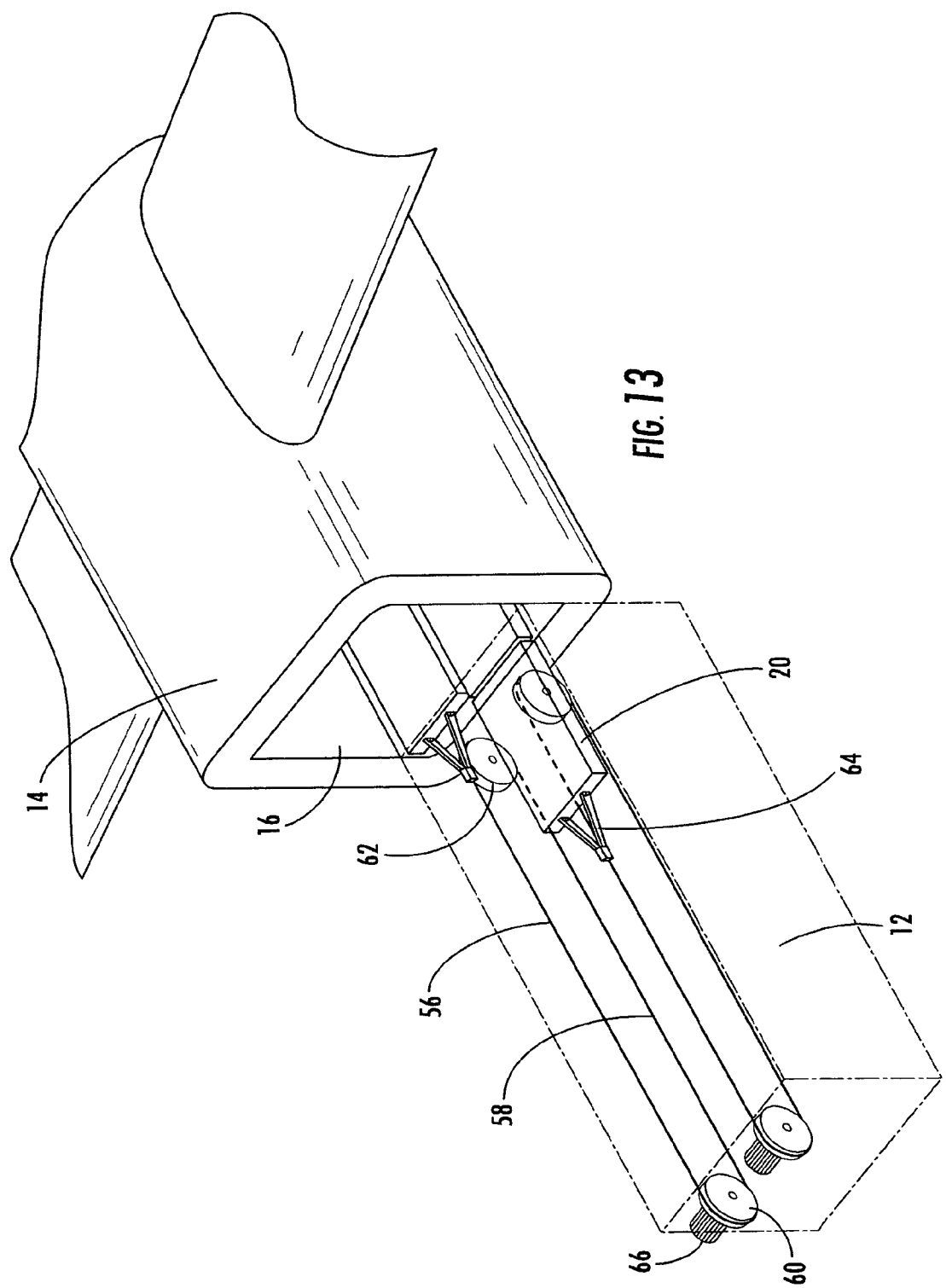
FIG. 13 is a partial perspective view of winch used to transport railcars between a loading dock and a transport vehicle according to one embodiment of the present invention.
Figure 14:
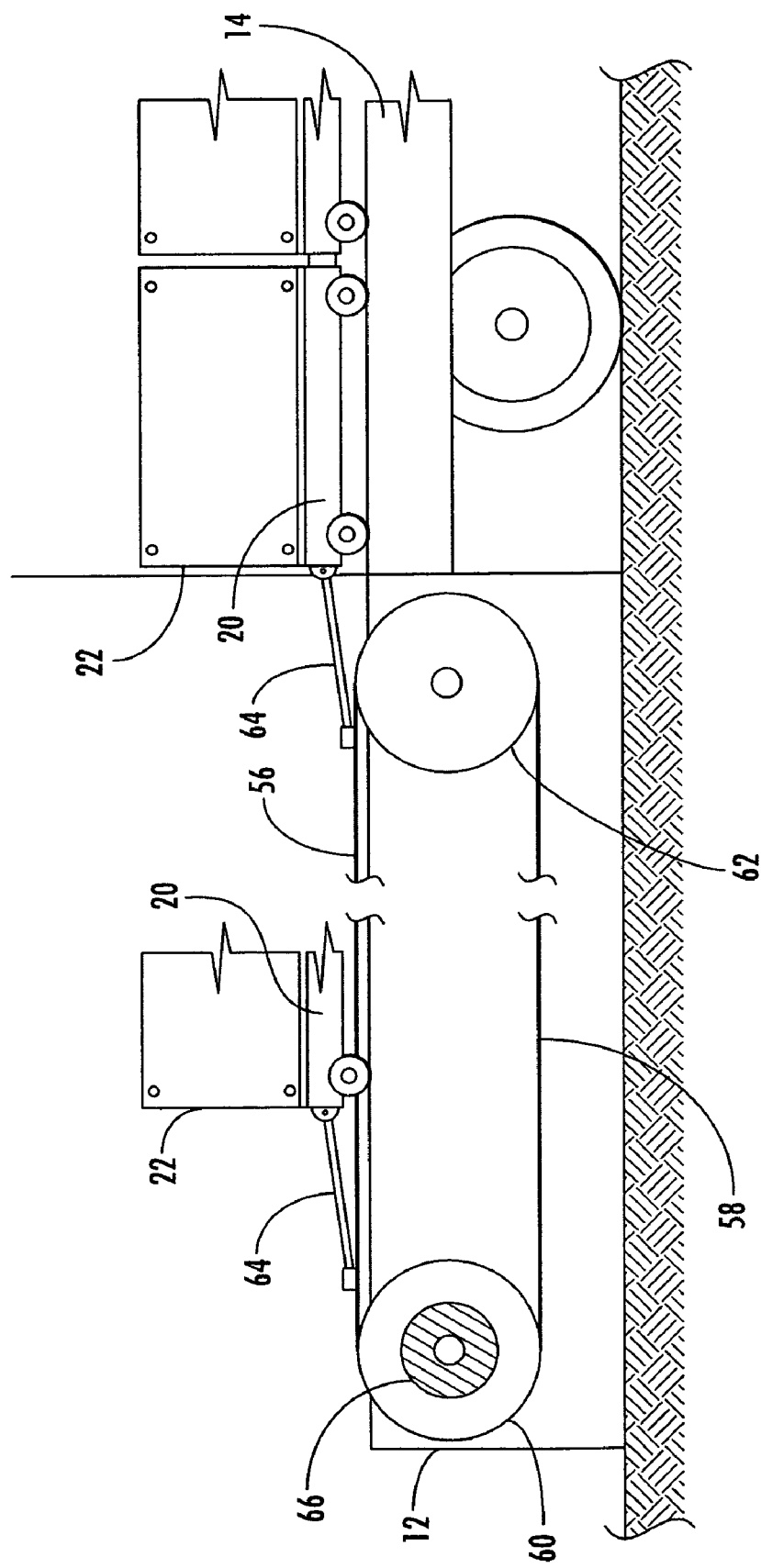
FIG. 14 is a cross-sectional view of the winch shown in FIG. 13.

FIGS. 13 and 14 illustrate an external winch, which operates in a similar manner to a cable-car street trolley or ski lift gondola. Drive 56 and return 58 cables extend the length of the loading dock 12 and between drive 60 and return 62 pulleys to form a loop or may be gathered at either end on spools. The forward end (towards the front of the transport vehicle 14) of the most-forward railcar 20 includes a bowsprit 64 that extends a few feet beyond the end of the railcar. The tip of the bowsprit 64 is fixed to the drive cable 56, and the drive cable is exposed on the surface of the loading dock 12. This forward-most railcar 20 can be attached to all of the other railcars in a row by a mechanical coupling. Thus, motion of the drive 56 and return 58 cables can be transferred to the entire row of railcars 20. The bowsprit 64 enables the railcar 20 to enter the transport vehicle 14 without extending the cable drive into the transport vehicle. Each of the drive 56 and return 58 cables may be driven by a drive motor 66. The drive motor 66 could be an electric motor or engine, which may include a brake. The drive cable 56 can be driven toward or away from the transport vehicle 14 and may be hidden beneath the floor of the loading dock 12. In this case, the bowsprit 64 engages the drive cable 56 through a slot in the floor of the loading dock 12.

Furthermore, each railcar 20 can be driven by an electric motor connected to one or more of the railcar's wheels 30. This motor can be powered by an external source by an umbilical cable or by contact with a conducting element as used in many electric trains and trolleys. Each railcar 20 could also be driven by an electric or combustion engine powered by an onboard source of energy such as a battery or fuel tank.

When the railcar 20 moves into the cargo bay 16, the position of the railcar must be well aligned with pylons 38 (described below) arranged on the floor of the cargo bay 16 to ensure proper engagement between the pylons and the ISO containers. If multiple railcars 20 are arranged in a row, the dimensions and coupling of the railcars are such that all railcars are aligned if any one railcar is aligned. Numerous ways to provide alignment of a single railcar 20 are possible and may be divided into "open loop" and "closed loop" systems.

An open-loop system has no feedback between the airplane cargo handling system and the propulsion means. This open-loop system is possible for use with an external winch system because of the precise registration of the transport vehicle 14 and loading dock 12. This open-loop system would drive the series of railcars 20 between two precise stops (in and out), where the stops could be adjusted to provide fine-tuning during service.

A closed-loop system uses a sensor that measures the displacement of the railcar 20 from its intended location. This displacement is fed back to the railcar 20 propulsion system to indicate what direction and how far the railcar should move. One embodiment of such a closed-loop system could incorporate an optical sensor 23 mounted to one of the pylons 38. The sensor 23 could read dedicated markings on the relevant railcar 20 that are coded to indicate positioning of the railcar. Such closed-loop systems are well understood by those skilled in the art of motion control, and numerous additional feedback systems to control the railcar 20 position are feasible.

The transport vehicle 14 includes a cargo bay 16 that is capable of storing and securing cargo containers 22 therein. The general concept of the cargo bay 16 is to provide rapid, straight-in loading; rapid transfer between the railcars 20 and the transport vehicle 14; and secure restraint of the cargo containers 22 within the transport vehicle. The floor of the cargo bay 16 has a series of parallel rails 18 that are coaxial with the rails on the loading dock 12. The rails 18 in the cargo bay 16 support and guide the railcars 20 traveling into and out of the cargo bay. Because rails 18 are provided on the floor of the cargo bay 16 for transporting the railcars 20, and pylons 38 are used to support the cargo containers 22 within the cargo bay, additional flooring within the cargo bay is optional. However, a floor in the cargo bay 16 enables crew to walk between the cargo containers 22 for inspection, service, firefighting, and so forth. Therefore, a floor within the cargo bay 16 spanning between the rails 18 provides increased functionality and safety, as well as stabilizing the rails laterally. With respect to aircraft, the floor provides a shear web to transfer longitudinal loads from the pylons 38 to the fuselage sidewalls of the transport vehicle 14, as well as a seal between the landing gear bays and the cargo bay 16 during flight, especially when the landing gear doors are open.

Figure 15:
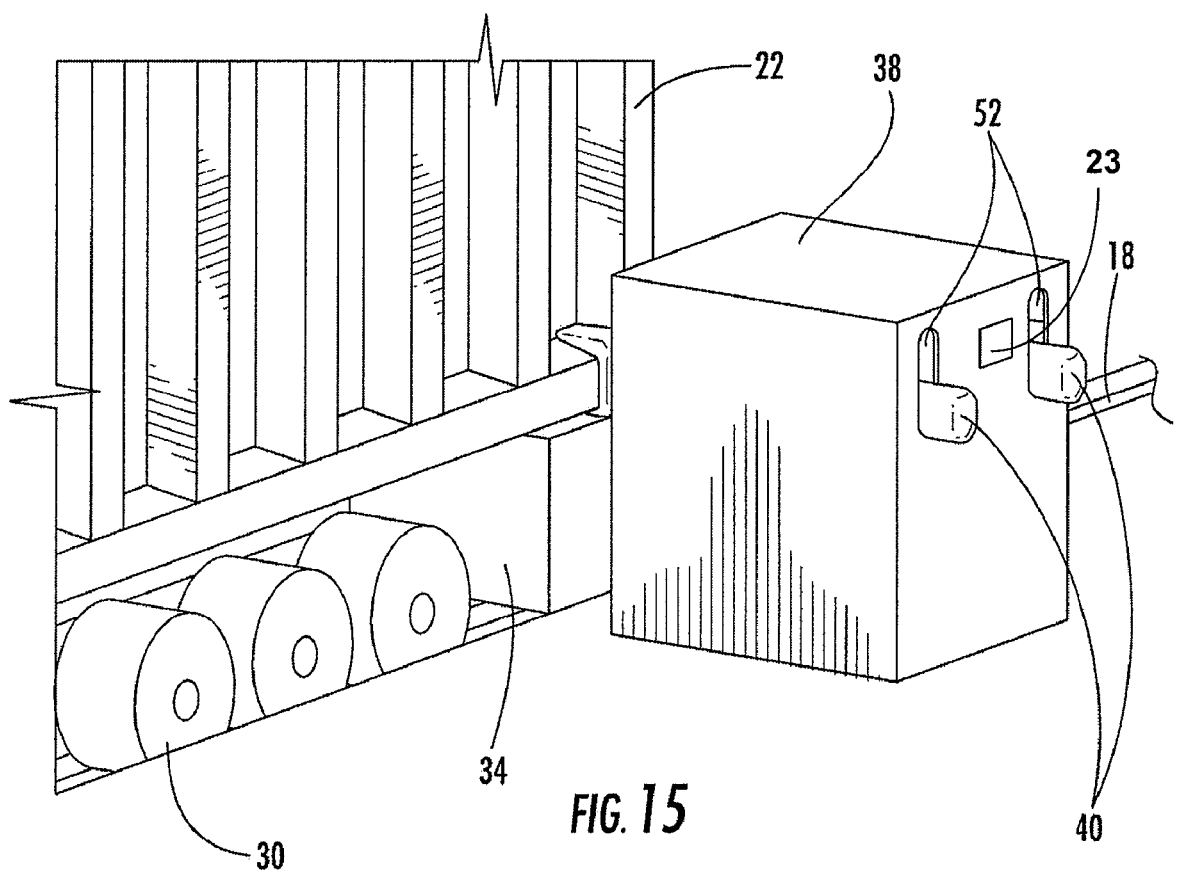
FIG. 15 is an enlarged perspective view of a pylon engaging an ISO container according to one embodiment of the present invention.

FIG. 1 illustrates that the floor of the cargo bay 16 includes a series of pylons 38 arranged in rows and positioned proximate to the rails 18. FIG. 15 illustrates an enlarged view of a single pylon 38. Each cargo container 22 is supported by four pylons 38, one at each corner. Each pylon 38 supports one to four cargo containers 22, depending on the location of the pylon. In the middle area of the floor of the cargo bay 16 (i.e., between rails 18 and between leading and trailing cargo containers 22), each pylon 38 is capable of supporting four cargo containers 22, one in each quadrant.

The pylons 38 are preferably attached to the floor of the cargo bay 16. Each pylon 38 is approximately a rectangular solid and fits between the rows of cargo containers 22 or outboard of the outboard rows of cargo containers. A pylon 38 is located at approximately 20-foot spacing along the length of the floor of the cargo bay 16, which corresponds to the approximate 20-foot length of the smaller ISO containers. The transport vehicle 14 may also carry 40-foot ISO containers that would require every-other pylon. The width of the pylons 38 is slightly less than the spacing between the cargo containers 22. The pylon 38 may slide or roll along a vertical or linear track for aligning with the cargo containers 22, and the pylon may be guided and constrained by a linkage system that maintains the vertical orientation of the pylon over its required range of motion. The orientation adjustment may be driven by a number of actuators including a hydraulic cylinder or jackscrew.

Figure 16:
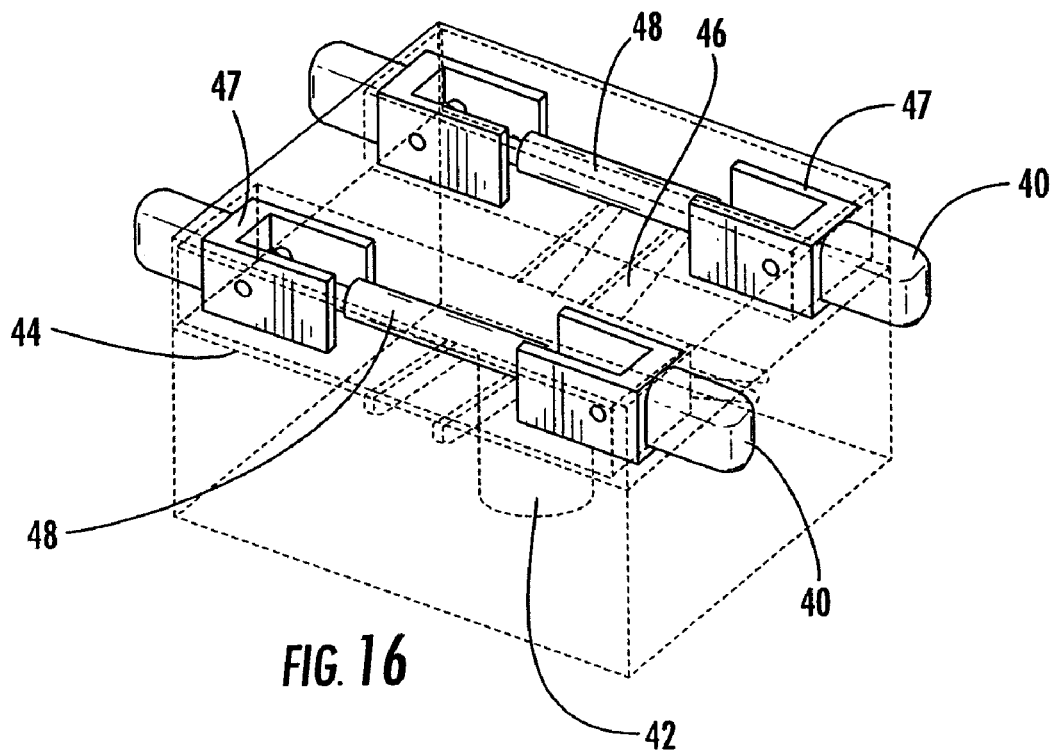
FIG. 16 is a perspective view of a pylon having restraint pins in an extended position according to one embodiment of the present invention.
Figure 17:
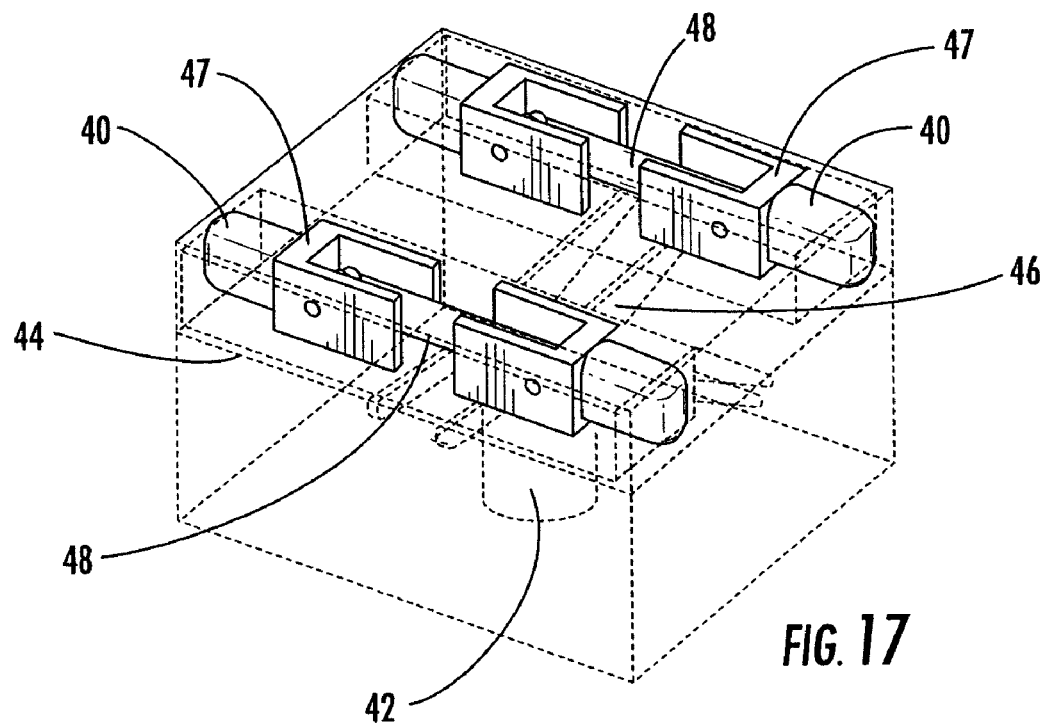
FIG. 17 is a perspective view of the pylon shown in FIG. 16 with restraint pins in a retracted position.

In addition to supporting the cargo container 22, the pylon 38 also serves to lift the containers off of the railcars 20 during loading and lower them during unloading. One embodiment of an actuator of the pylon 38 for the cargo containers 22 is shown in FIGS. 16 and 17. The lifting mechanism includes a hydraulic cylinder 42 attached to support arms 46 that supports a tray 44 and one or more restraint pins 40. Each of the restraint pins 40 includes a bracket 47 that is attached to the tray 44, such that movement by the hydraulic cylinder 42 transfers force through the support arms 46 and tray and to the restraint pins. Each of brackets 47 includes a hole to enable the ends of the restraint pins 40 to extend and retract within the pylon 38. FIG. 15 demonstrates that slots 52 are provided in opposed surfaces of the pylons 38 to allow the ends of the restraint pins 40 to slide within the slots when the hydraulic cylinder 42 lifts and lowers the pylon. Thus, the restraint pins 40 may not only extend laterally and horizontally through the pylon but also move vertically within the pylon. Raising the cargo containers 22 may be done by raising the pylon 38 as a whole as described above, or by fixing the pylon and raising the restraint pins 40 during or after extension of the restraint pins. Such compound motion of the restraint pin 40 may be accomplished with a variety of mechanisms.

Figure 18:
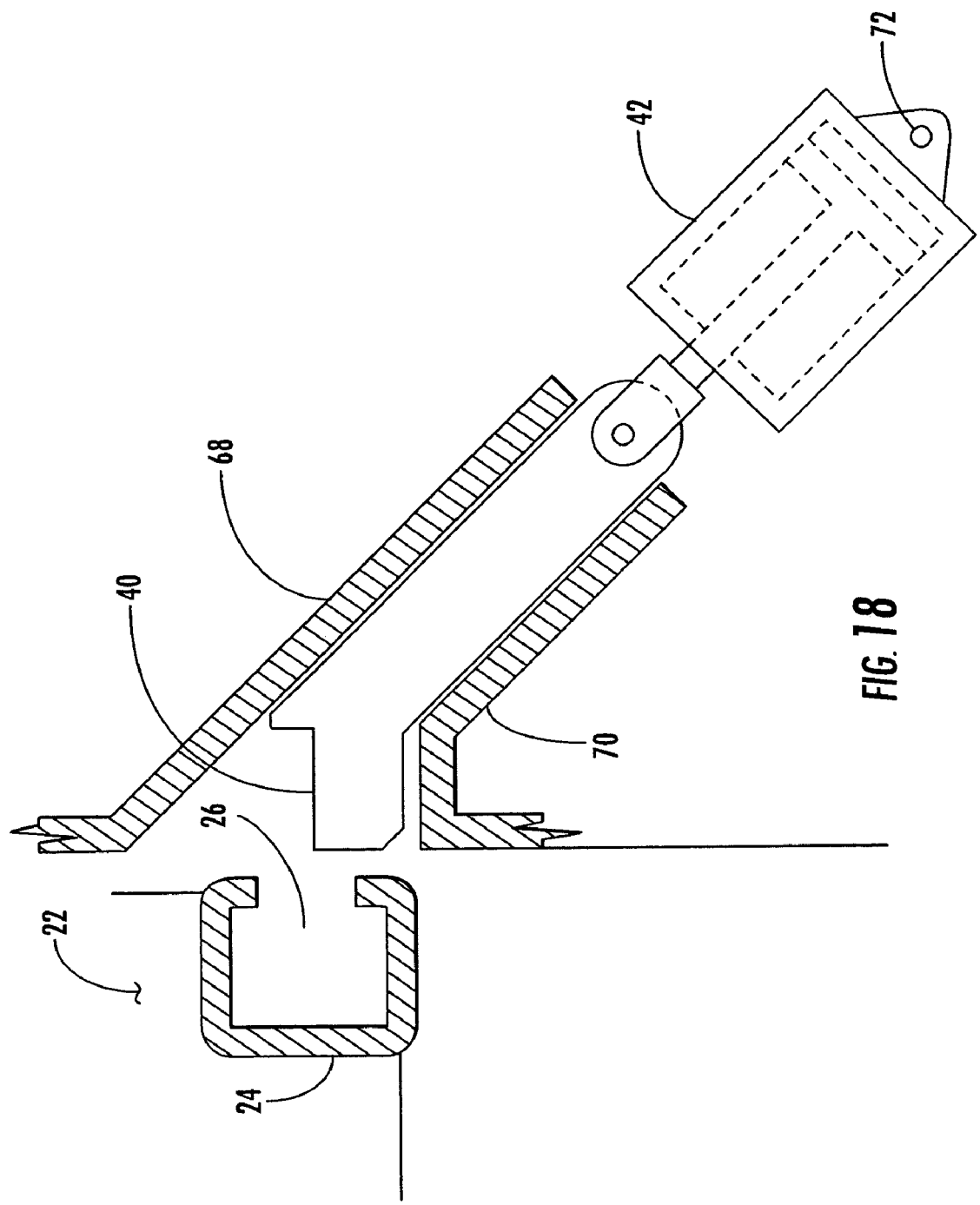
FIG. 18 is a cross-sectional view of a pylon with restraint pins in a retracted position according to one embodiment of the present invention.
Figure 19:
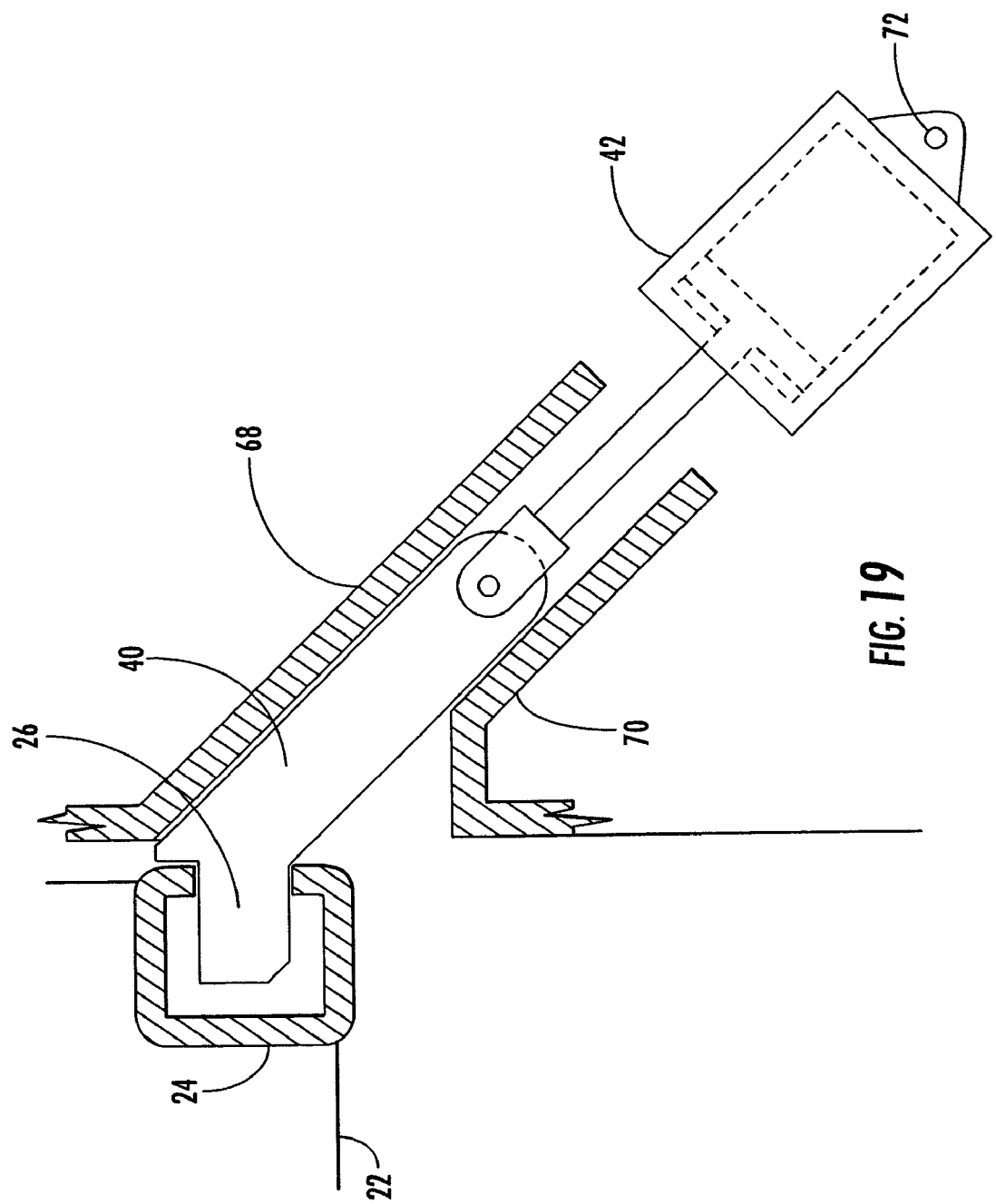
FIG. 19 is a cross-sectional view of the pylon shown in FIG. 18 with the restraint pins in an extended position according to one embodiment of the present invention.

For example, FIGS. 18 and 19 illustrate a mechanism that may extend a restraint pin 40 both laterally and vertically to engage a corner fitting 24 of a cargo container 24. The restraint pin 40 is coupled to a hydraulic cylinder 42 or similar mechanism, while the actuator is attached to the pylon 38 through hole 72. The restraint pin 40 is constrained between an upper guide 68 and a lower guide 70 such that when the hydraulic cylinder 42 is actuated, the restraint pin travels between the upper and lower guides. FIG. 18 depicts the restraint pin 40 in a retracted position, while FIG. 19 shows the restraint pin in an extended position. In the extended position, the restraint pin 40 is configured to engage a corner fitting 24 of a cargo container 22. Thus, the pylon 38 is capable of moving the restraint pin 40 vertically between the upper 68 and lower 70 guides, as well as horizontally in the hole 26 of the corner fitting 24. As a result, the cargo container 22 is displaced vertically through the cooperation of the extended restraint pins 40 at each of the corner fittings 24.

Moreover, the railcar 20 may incorporate a mechanism to raise the cargo container 22 relative to the rails 18. This may be done with an actuator between the wheel 30 axles and the chassis 32, or by an actuator between the chassis and the support pads 34. Various types of mechanisms well known by those skilled in the art could be employed. For example, the mechanism could include a linkage to guide and constrain the relative motion between the moving components and an actuator to provide the required force. Providing a mechanism on the railcar 20 to elevate the cargo container 22 permits the pylons 38 to be lighter and less complex since the pylons would not be required to elevate the cargo container.

The pylons 38 connect to respective corner fittings 24 of ISO containers with restraint pins 40, where the number or restraint pins corresponds to the number of cargo containers 22 that it supports. The restraint pin 40 can be retracted into the pylon 38 so that it does not project beyond the side surface of the pylon, as shown in FIG. 17. Retracting the restraint pins 40 allows the cargo containers 22 to be readily removed from the cargo bay 16 or transported into the cargo bay and proximate to the pylons 38. The retracted restraint pin 40 can also be extended laterally (See FIG. 16) from the side of the pylon to engage the corner of the ISO container through the hole 26 in the side of the corner fitting 24, as shown in FIG. 15. The restraint pin 40 is subjected to vertical and longitudinal loads from the cargo container 22 and transfers these loads to the pylon 38. Lateral loads are transferred by direct contact between the ISO container corner fitting 24 and the lateral face of the pylon 38. Thus, lateral loads are transferred in only one direction. For instance, a force that tends to move a cargo container 22 to the left will only load the left hand pair of pylons 38. Rotation of the cargo container 22 is resisted by a combination of longitudinal, lateral, and vertical forces within the four pylons 38 supporting the cargo container.

Figure 20:
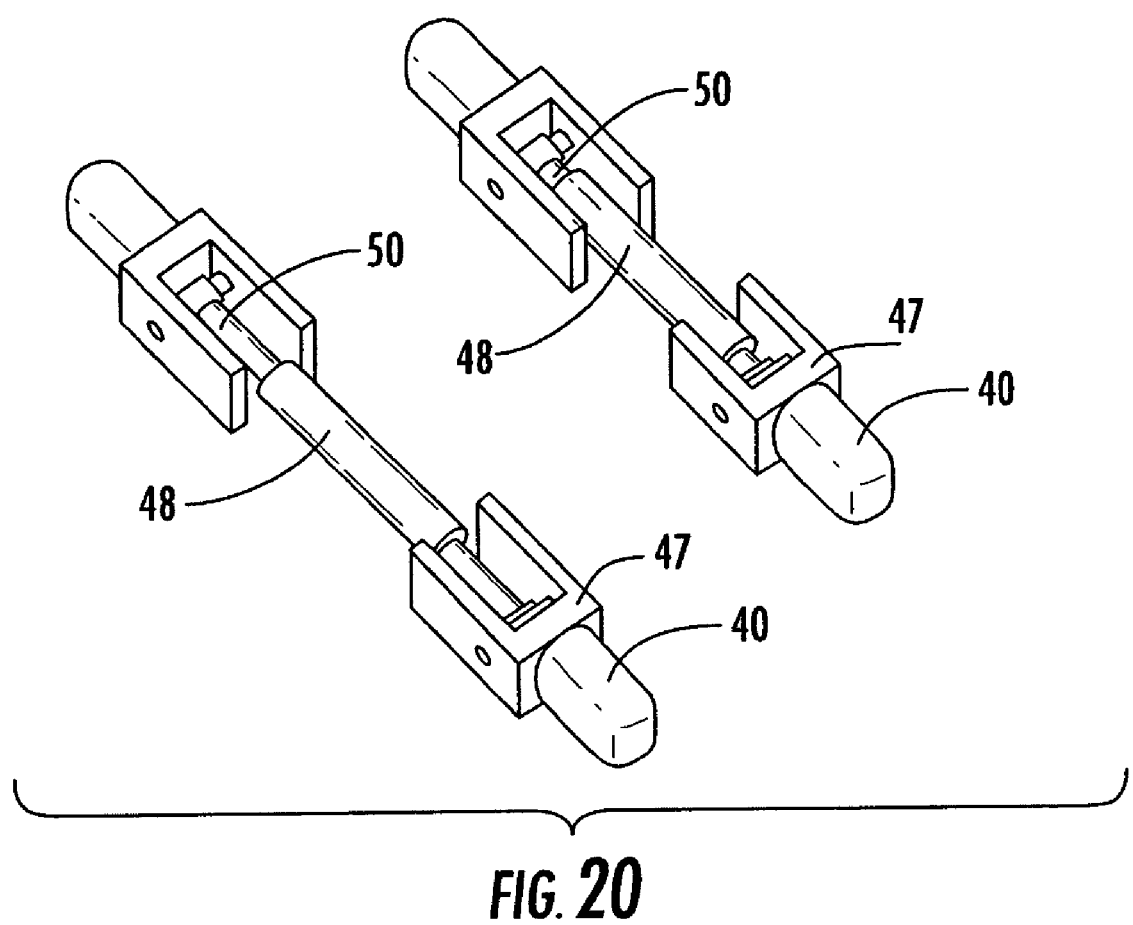
FIG. 20 is a perspective view of the restraint pins in an extended position and a retracted position according to one embodiment of the present invention.

Numerous mechanisms are possible to extend and retract the restraint pin 40. For instance, sliding motion of the restraint pin 40 may be directly driven by a hydraulic, electromechanical, or similar actuator or by an actuator in cooperation with a linkage. FIG. 20 illustrates a restraint pin 40 having a hydraulic cylinder 48 and hydraulic piston 50 that cooperate to extend and retract the restraint pins. In addition, rotary, rather than sliding, motion may be feasible to actuate the restraint pins 40.

Each restraint pin 40 would be equipped with a sensor or switch that provides an indication of the restraint pin position to the pilot or loadmaster. Therefore, for safety, the sensors ensure that the cargo containers 22 are truly restrained while being transported by the transport vehicle 14. Similarly, the sensors ensure that all restraint pins 40 are withdrawn from the cargo containers 22 before attempting to extract the containers with the railcars 20 from the transport vehicle 14.

Once the cargo containers 22 are loaded into the transport vehicle 14 and the railcars 20 are withdrawn, it may be advantageous to leave the cargo containers in the elevated position. The restraint pins 40 and/or pylons 38 could be employed to elevate the cargo containers 22. Thus, the restraint pins 40 and/or pylons 38 could maintain the elevation of the cargo containers 22 without requiring significant actuator force, which reduces the probability of an actuator leak or other failure in restraining the cargo containers. In the elevated position, the railcars 20 may be readily moved into and out of the cargo bay 16 for subsequent loading and unloading of cargo containers 22. Furthermore, elevating the cargo containers 22 eliminates the need for a pallet or similar platform to remain with the cargo containers as the containers are completely restrained at the corner fittings 24. Accordingly, eliminating pallets and platforms reduces weight on the transport vehicle 14, which is particularly advantageous for aircraft where the weight penalty is significantly reduced.

As described above, ISO containers are equipped with load-bearing corner fittings 24 at all eight corners, and each of these fittings has engagement holes 26 in all three external faces. The vertical motion of the pylons 38 to raise the cargo containers 22 off of the railcars 20 provides the opportunity to simultaneously engage the containers' upper corner fittings 24 with locating pins mounted to the ceiling of each level of the cargo bay 16. Uniform dimensions of ISO containers facilitate registration of the locating pins into the holes 26 of the corner fittings 24. This additional restraint is advantageous in reducing the loads on the floor-mounted pylons 38. Particularly in the case where a cargo bay 16 is two or more cargo containers 22 high, the forces on the pylons 38 that result from lateral and longitudinal tipping can be high. By also restraining the cargo containers 22 from the ceiling with locating pins, the tipping moments can be resisted over a much longer couple, greatly reducing restraint forces.

In one embodiment of the present invention, the ceiling of the cargo bay 16 includes upper restraints having pads with tapered locating pins. The locating pins are positioned to engage the cargo containers 22 as the containers are raised. To accommodate cargo containers 22 of different lengths, the locating pins could be retractable, using a mechanism similar to the restraint pin 40 extension mechanism in the pylons 38, or the locating pins may be spring-loaded so that they may retract under pressure but engage when aligned with a hole 26 of a corner fitting 24. Therefore, locating pins that correspond to the corner fittings 24 of the cargo containers 22 will retract when a longer cargo container is loaded within the cargo bay 16 since the intermediate pins would otherwise conflict with the body of the cargo container.

The steps for loading and unloading cargo containers 22 from a transport vehicle 14 includes loading cargo containers onto railcars 20 from above while the railcars are on the loading dock 12. The railcars 20 are rolled into the cargo bay 16 of the transport vehicle 14 so that the cargo containers 22 align with the pylons 38 on each lateral side of the containers. The pylon restraint pins 40 are extended to engage the outboard side of the lower corner fittings 24 of each cargo container 22. The pylon 38 is raised vertically a few inches by a mechanism until the cargo containers 22 are lifted off of the railcars 20. The railcars 20 are extracted from the transport vehicle 14, which completes the loading sequence.

The transport vehicle 14 is unloaded in the reverse of the loading process. After docking, empty waiting railcars are rolled into the cargo bay 16 beneath the cargo containers 22. The pylons 38 are lowered so that the cargo containers 22 rest on the railcars 20. The pylon restraint pins 40 are withdrawn from the corner fittings 24. The railcars (with cargo containers 22 aboard) are withdrawn from the transport vehicle 14. The empty transport vehicle 14 is now free to depart or may wait for a new load of cargo containers 22. The cargo containers 22 are subsequently removed from the railcars 20 from above by a crane or similar device.

FIG. 21 illustrates a cargo port system 100 that could be employed with the cargo handling system 10 described above. Cargo containers 22 are positioned on one or more loading docks 12 in preparation for loading into a transport vehicle 14 along a longitudinal axis. The cargo containers 22 are brought to the loading dock 12 laterally via one or more overhead cranes 102. The cranes 102 transfer the cargo containers 22 from one or more rows of trucks 104 on one side of the loading dock 12 or from one or more rows of railroad cars 106 on the other side of the dock. The overhead crane 102 uses a moving element that can carry one or more cargo containers 22 at the same time in order to speed load transfer.

The basic module of the cargo port system 100 is shown in FIG. 21 for an aircraft transport vehicle. The basic components, each of which are described below, of the cargo port system 100 includes an airplane ramp 134, loading dock 12, optional railway 106, truck loading 122, queuing 124, and waiting areas, transfer area 116 and storage area 120. The components can be repeated indefinitely to provide greater airport capacity. The module can also be mirrored so that the storage area 120 can be between, and serve, two loading docks 12. As such, the cargo port system 100 depicted in FIG. 21 is not meant to be limiting, as there are various configurations and combinations of components that may be employed with the present invention. In addition, although FIG. 21 illustrates an aircraft in the cargo port system 100, it is understood that the cargo port system is adaptable for other transport vehicles 14, such as ships, railroads, or trucks.

The overhead cranes 102 extend beyond the truck side of the loading dock 12 to a transfer area 116. Loads from the loading dock 12, trains 106, or trucks 104 can be moved laterally to the transfer area 116. From this transfer area 116, a storage crane 114 can pick up the cargo containers 22 and move the containers to a precise location in the storage area 120. The storage crane 114 can also move the cargo containers 22 laterally across and beyond the storage area 120 to an opposite container transfer area where the containers may be picked up by the next dock's overhead crane. In this way, loads can be transferred from one loading dock 12 to another without the use of surface vehicles such as "yard trucks."

The truck loading area 122 is parallel and adjacent to the loading dock 12. In this position, one or more rows of trucks 104 can be loaded or unloaded from the overhead crane 102. The truck queuing area 124 feeds into the truck loading area 122, where trucks 104 enter the queuing area from a truck waiting area. Computer-controlled planning and signaling are utilized to instruct the trucks 104 when to leave the waiting area and which lane of the queuing area 124 to enter so that they may pick up a specific cargo container 22 or may drop off a container to a specific location on the loading dock 12.

The railroad loading area 126 is one or more rail spurs adjacent to the one loading dock 12 on the opposite side from the truck loading area 122. The overhead dock crane 102 moves cargo containers 22 from the loading dock 12, truck 104, or transfer area 116 to the railroad cars 106. ISO containers are typically carried two-high on special railroad cars 106. The ISO containers are lifted off one layer at a time by a dock crane 102 or train crane 128. The train of railroad cars 106 is typically much longer than the loading dock 12, and the extent of the railroad loading area 126 is constrained by the presence of the transport vehicle 14. Railroad cars 106 positioned adjacent to the loading dock 12 are capable of being loaded with cargo containers 22 directly from the overhead crane 102 that serves the dock. To reach railroad cars 106 that are located out of reach of the overhead cranes 102, a short "shuttle train" could be used to transfer the cargo containers 22 from the loading dock 12 to the length of the train. Separate train cranes 128 then take the cargo containers 22 off the shuttle train and place it on the longer, waiting railroad cars 106. The railroad cars 106 may also be served directly by trucks using a loading area adjacent to the railroad rails on the opposite side from the loading dock. This loading area is not shown in the illustrations, but its presence is implied by the cantilevered elements of the train cranes 128.

As described briefly above, overhead loading cranes 102 and storage cranes 114 are used to transfer loads of cargo containers 22 to and from vehicles and the loading dock 12, and to and from the load transfer area 116 and storage area 120. The crane 102 is a large structure including a fixed frame and a moving element that is connected to the container loads. The frame includes horizontal beams 108 and vertical frames 110. The vertical frames 110 contain coplanar wheels that permit longitudinal motion, where longitudinal motion is parallel to the longitudinal axis of the transport vehicle 14 and loading dock 12. The horizontal beams 108 form tracks for the lateral movement of a moving element 112.

The moving element 112 includes a chassis that runs on the horizontal beams 108 of the frame. A fixture is attached to the chassis via controllable-length cables that permit the fixture to move vertically. The fixture is equipped with devices that can connect to one or more cargo containers 22 at a time. The combination of movement provided by the longitudinal motion of the frame, the lateral motion of the moving element 112, and the vertical motion of the fixture enable the cargo port system 100 to pick up, move, and place cargo containers 22 three-dimensionally. The moving element 112 is driven by a motor or engine to overcome inertia, drag, wind forces, and other forces resisting motion. One or more brakes may be used to slow, stop, or hold the moving element 112.

The fixture is connected by cable to winches located within the moving element 112. The fixture can hold one or more cargo containers 22 by engaging the top four corner fittings 22 found in all ISO containers. The fixture is compatible with 20 and 40-foot ISO containers used in the transport vehicle 14. The transport vehicle 14 can accommodate five cargo containers 22 laterally, and the fixture can carry five 40-foot ISO containers or 10 20-foot ISO containers. However, it is understood that the transport vehicle 14 and fixture may accommodate one or more cargo containers 22 laterally in additional aspects of the present invention. The mechanisms to winch and engage the cargo containers 22 are known to those skilled in the art. The winches are typically powered by motors or engines to overcome gravitational and inertial forces, and one or more brakes are employed at each winch to slow, stop, or hold the winch.

Each of the three axes of motion of the crane 102 is provided with position sensors so that the position of the cargo containers 22 or fixture is known with sufficient precision. Numerous ways of sensing the position are possible such as, for example, Global Positioning System (GPS), optical position sensing, laser range finding, and other techniques known to those skilled in the art of motion control.

The motion of each of the three axes is controlled by a computer system with guidance from an operator. Destination and pathway inputs drive the computer to move the cargo containers 22 or fixture. Feedback from the position sensors assures sufficiently precise motion. Communication with other cranes 102 in the system 100 assures that collisions between cranes or cargo container 22 loads are avoided. The control computer receives planning information so that the computer may determine in advance where each cargo container 22 is coming from and where it is going. For instance, the computer may identity and locate each cargo container 22 in the storage area so that it can be quickly retrieved when required.

Various cranes 102 may be utilized with the cargo port system 100. For instance, a dock crane 102 is designated for operations on the loading dock 12. The dock crane 102 moves loads from the loading dock 12 to trucks 104 in the loading area, the transfer area 116, or to trains in the train loading area 122 and vice-versa. Storage cranes 114 operate in the storage area 120 and transfer the cargo containers 22 from the transfer area 116 to the storage area. In the storage area 120 the cargo containers 22 may be stacked one or more layers deep. The storage crane 114 also retrieves cargo containers 22 from the storage yard for eventual delivery to a truck 104, the loading dock 12, or a train 106 via the transfer area 116 and the dock crane 102. The storage crane 114 can also transfer a load from one transfer area 116 to the next so that it can reach a neighboring loading dock 12. The storage crane 114 is positioned slightly lower than the dock crane 102 so that the two cranes can overlap and reach the transfer area 116. Computer-aided collision avoidance is required so that loads on the dock crane 102 and storage crane 114 do not collide. A further type of crane employed with the cargo port system 100 is a train crane 128. The train crane 128 transfers cargo container 22 loads from trains 106 to trucks 104 and vice versa without crossing the loading dock 12. The train crane 128 may also transfer cargo containers 22 to and from shuttle trains, as described above. The train crane 128 is also slightly lower than the dock crane 102 so that it may pass under the dock crane.

The truck loading area 122 is parallel and adjacent to the loading dock 12. One or more rows of trucks 104 are positioned to deliver or receive loads of cargo containers 22 via the dock crane 102. If the trucks 104 are spaced the same as the cargo containers 22 within the transport vehicle 14 it may be possible to pick up multiple cargo containers in a single operation from multiple side-by-side trucks. As shown in FIG. 21, five parallel rows of trucks 104 are shown in the truck loading area 122. However, it is understood that the number of trucks 104 may vary but typically corresponds to the number of rows on the loading dock 12 and in the transport vehicle 14.

Precise truck 104 spacing may be possible with special truck guidance systems. One example could be a laser line or plane to which the driver aligns his or her truck. Alternatively, the loading area could include grooves in the pavement that guide the truck's 104 tires. Fore and aft alignment could be provided by signaling systems or other techniques. If multiple dock cranes 102 are employed, multiple groups of trucks 104 can be lined up in the truck loading area 122 as shown in FIG. 21. As soon as one line of trucks 104 has finished transferring their loads, the next line of trucks can move into position.

A truck queuing area 124 is provided to efficiently and systematically queue trucks 104. In other words, by allowing the trucks 104 to pre-position before the actual load transfer process, it is possible for the trucks to be prepared and readily queued when needed. The truck queuing area 124 has numerous lanes. Computer planning defines which lane each truck 104 must enter and when it must enter (and which truck it must follow). Further planning defines which of the lanes the truck 104 must enter in the truck loading area 122. Thus, the truck 104 ends up in the correct location to pick up the correct cargo container 22 or to deliver its container to the desired location on the loading dock 12. In the particular arrangement shown in FIG. 21 the truck queuing area 124 is adjacent to the truck loading area 122 and is connected to the loading area with a large U-turn 132. This permits the trucks 104 to arrive at the queuing area 124 from the waiting area at some distance away from the transport vehicle 14 operations area.

The truck waiting area (not shown) provides a location for trucks 104 that arrive early to wait before they join the queue in the truck queuing area 124. This waiting area serves as another buffer to smooth out minor and major scheduling irregularities in truck 104 arrival. A late truck 104 arrival results in a disruption to the cargo handling system 10. When a truck 104 arrives late for a pickup, its load must be stored, disrupting the smooth process of unloading. In this case, the truck 104 might have to wait until the dock crane 102 is not busy to pick up its load. When a truck 104 arrives late for its delivery, the transport vehicle 14 may well have left without the load. In this case the load would be transferred to the storage area 120 for delivery on the next available transport vehicle 14. To reduce the risk of late arrival, a waiting area is provided so that trucks 104 may arrive early. The waiting area provides for diagonal parking and flow-through departure. A signal system would alert the driver that it is time to join the queue and direct the driver to the proper lane.

The transfer area 116 is located at the overlapping boundary of the dock crane 102 and the storage crane 114 between the truck queuing area 124 and the storage area 120. To transfer a load from the loading dock 12 to the storage area 120, for instance, the dock crane 102 carries the load to the transfer area 116 and deposits it there. The storage crane 114 then picks up the load and moves it to its designated location in the storage area 120. The transfer area 116 may be a simple pad or structure and may be equipped with fixed locating pins that engage the ISO corner fittings 24. The locating pins facilitate more precise positioning of the cargo containers 22, allowing the next crane 102 to easily locate and transfer the containers to the next location. The transfer area 116 is large enough to accommodate several cargo containers 22. A larger number of cargo containers 22 provides a buffer so that containers may be placed there quickly and picked up at some later time.

The storage area 120 is used for short and long-term storage of cargo containers 22. The storage area 120 provides specific locations with specific addresses for cargo containers 22 so that containers deposited there may be readily retrieved by overhead cranes 102. The storage area 120 may be one or more cargo containers 22 in height. The control computer keeps track of the location and height of each stored cargo container 22. If a cargo container 22 is to be stored atop another container, the control computer identifies the height of the lower container and places the upper container on the lower container. The storage area 120 may be between two loading docks 12 and may service both docks via a transfer area 116 at each boundary. As a result, a cargo container 22 stored at one loading dock 12 may be retrieved by another adjacent loading dock. Similarly, the storage crane 114 may directly transfer a load of cargo containers 22 from one transfer area 116 to another adjacent transfer area.

A parking ramp 134 (also known as "apron") for the transport vehicle 14 is aligned with the loading dock 12. The ramp 134 provides sufficient support for the weight of the transport vehicle 14, as well as additional space for the transport vehicle to maneuver into a docking position. With respect to aircraft transport vehicles 14, the ramp 134 is linked by taxiways 136 to other ramps and to a runway. The ramp 134 may also be linked to service areas for maintenance, repair, refueling, and/or other service to the transport vehicle 14.

The present invention provides several advantages. The cargo handling system 10 is capable of transporting cargo into and within a transport vehicle efficiently and effectively. For example, cargo containers 22 can be pre-staged on railcars 20 positioned on a loading dock 12 such that the railcars may transport the containers within a cargo bay 16 of a transport vehicle 14 simultaneously. As a result of this increased efficiency, a reduced amount of time and workforce is required to load and/or unload the cargo into and/or out of the transport vehicle 14. In addition, transport vehicles 14, such as aircraft, are not required to be grounded for a substantial period of time so that the downtime is minimized. Furthermore, the loading docks 12 are capable of being spaced more closely together than that shown in FIG. 21 due to the decreased probability that the transport vehicles 14 will be docked at the same time or that their schedules will conflict. As a result, the amount of space needed for cargo handling is reduced, as well as the time and complexity required to transfer cargo between loading docks.

The cargo handling system 10 is capable of handling ISO containers without requiring a pallet or platform, and may effectively transport the ISO containers in and out of a cargo bay 16. Because the cargo containers 22 are capable of being secured within the cargo bay 16 in an elevated position, the railcars 20 may be withdrawn from the cargo bay 16 after transporting the cargo containers into the cargo bay. Eliminating pallets or platforms and removing the railcars 20 from the cargo bay 16 reduces the weight penalty on the transport vehicle 14. The railcars 20 include a low profile that reduces the size of the cargo bay 16 required to accommodate the cargo containers 22. In addition, the cargo containers 22 are effectively restrained within the transport vehicle 14 with a combination of pylons 38, restraint pins 40, and/or ceiling locating pins within the cargo bay 16 that reduces the possibility of shifting of the cargo containers or failure of any one mechanism or device.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for cargo container handling comprising:
a transport vehicle comprising a cargo bay capable of housing a plurality of cargo containers, each cargo container comprising a plurality of corner fittings;
a loading dock comprising an end for coupling to the cargo bay, the loading dock capable of supporting a plurality of cargo containers;

at least one railcar, wherein the railcar is capable of carrying at least a portion of a cargo container between the loading dock and cargo bay while traveling along rails positioned on the loading dock and within the cargo bay; and a plurality of pylons positioned along a floor of the cargo bay, wherein each pylon comprises at least one restraint pin configured to move between a retracted position within the pylon and an extended position outside of the pylon, wherein a predetermined number of pylons are cooperatively operable to laterally engage respective corner fittings of a cargo container with respective restraint pins and vertically elevate and lower the cargo container within the cargo bay while the restraint pins are in the extended position and engaging the corner fittings.

2. The system according to claim 1, wherein the cargo bay comprises an upper and lower deck, and wherein the loading dock comprises an upper and lower dock that align with respective upper and lower decks of the cargo bay.

3. The system according to claim 2, wherein each of the upper and lower docks of the loading dock is at least as long as each of the upper and lower decks of the cargo bay.

4. The system according to claim 1, wherein the transport vehicle is a ground effect aircraft having a swing nose for exposing the cargo bay.

5. The system according to claim 1, wherein the predetermined number of pylons are configured to engage respective corner fittings of a cargo container and vertically elevate the cargo container off of the railcar such that the cargo container is independently supported by respective restraint pins of the predetermined number of pylons.

6. The system according to claim 1, further comprising a plurality of rows of railcars arranged in parallel on the loading dock, each row of railcars comprising a plurality of interconnected railcars and capable of loading and unloading a plurality of cargo containers to and from the transport vehicle simultaneously.

7. The system according to claim 6, wherein each railcar carries a plurality of cargo containers.

8. The system of according to claim 1, wherein the transport vehicle and loading dock each comprises a pair of rails, wherein each railcar is configured to travel along a respective pair of rails, and wherein each of the plurality of pylons is spaced laterally outwardly of a respective pair of rails.

9. The system according to claim 8, wherein a width of the cargo container is approximately equal to the lateral spacing between a respective pair of rails.

10. The system of claim 1, wherein each pylon defines at least one slot, and wherein a respective restraint pin is configured to extend laterally through the slot and move vertically within the slot while in the extended position.

11. The system according to claim 10, wherein each pylon defines at least one slot defined in opposed surfaces of the pylon, and wherein each restraint pin is capable of extending through each slot simultaneously.

12. The system according to claim 11, wherein each pylon defines a pair of slots defined in opposed surfaces of the pylon and a pair of restraint pins, and wherein each restraint pin is configured to extend through a respective pair of slots.

13. The system according to claim 1, wherein at least one pylon is configured to laterally engage and vertically elevate a plurality of cargo containers simultaneously.

14. The system according to claim 1, wherein four pylons are configured to engage respective corner fittings of a cargo container.

15. The system according to claim 14, wherein each of the four pylons are spaced apart from one another.

16. A system for cargo container handling comprising:
a transport vehicle comprising a cargo bay capable of housing a plurality of cargo containers, each cargo container comprising a plurality of corner fittings;
a loading dock comprising an end for coupling to the cargo bay, the loading dock capable of supporting a plurality of cargo containers;
at least one railcar, wherein the railcar is capable of carrying at least a portion of a cargo container between the loading dock and cargo bay while traveling along rails positioned on the loading dock and within the cargo bay; and
a plurality of pylons positioned along a floor of the cargo bay, wherein a predetermined number of pylons are cooperatively operable to laterally engage respective corner fittings of a cargo container and vertically elevate and lower the cargo container within the cargo bay while engaging the corner fittings, and wherein at least one pylon is operable to laterally engage and vertically elevate a plurality of cargo containers simultaneously.

17. The system according to claim 16, wherein at least one pylon is configured to laterally engage and vertically elevate four cargo containers simultaneously.

* * * * *